US008572475B2

(12) United States Patent
Chikyu

(10) Patent No.: US 8,572,475 B2
(45) Date of Patent: Oct. 29, 2013

(54) DISPLAY CONTROL OF PAGE DATA BY ANNOTATION SELECTION

(75) Inventor: Masafumi Chikyu, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 714 days.

(21) Appl. No.: 12/403,892

(22) Filed: Mar. 13, 2009

(65) Prior Publication Data

US 2010/0058166 A1 Mar. 4, 2010

(30) Foreign Application Priority Data

Sep. 2, 2008 (JP) ................................. 2008-225248

(51) Int. Cl.
*G06F 17/24* (2006.01)
(52) U.S. Cl.
USPC .......................................... 715/230; 715/277
(58) Field of Classification Search
USPC ................................................. 715/230, 277
See application file for complete search history.

(56) References Cited

U.S. PATENT DOCUMENTS

| 6,389,434 | B1* | 5/2002 | Rivette et al. | ................. | 715/209 |
| 2004/0216032 | A1* | 10/2004 | Amitay et al. | ................. | 715/500 |
| 2005/0177578 | A1* | 8/2005 | Chen et al. | ..................... | 707/100 |
| 2006/0150079 | A1* | 7/2006 | Albornoz et al. | ............ | 715/512 |
| 2008/0222512 | A1* | 9/2008 | Albornoz et al. | ............ | 715/230 |

FOREIGN PATENT DOCUMENTS

| JP | 07-114543 A | 5/1995 |
| JP | 2002-207547 A | 7/2002 |
| JP | 2004-013416 A | 1/2004 |
| JP | 2007072577 A | 3/2007 |

OTHER PUBLICATIONS

Akiyama Hideji, Image Display Method and Computer-Readable Recording Medium JP 2002-207547 Translation.*
Kudo Yoji, Apparatus and Method for Document Processing JP 2004-013416 Translation.*
English Translation of Japanese Office Action issued Jan. 8, 2013 in corresponding Japanese Patent Application No. 2008-225248.

* cited by examiner

*Primary Examiner* — Cesar Paula
*Assistant Examiner* — Mohammed-Ibrahim Zuberi
(74) *Attorney, Agent, or Firm* — Sughrue Mion, PLLC

(57) ABSTRACT

An information processing apparatus includes: an operation input unit; an electronic information display control unit; an electronic information operation control unit; an annotation operation control unit; and an electronic information data holding unit, wherein the annotation operation control unit, in a case where the at least one annotation object is pasted on a page, holds a displaying magnification of a page on which the at least one annotation object is pasted and a displaying position on the page on which the at least one annotation object is pasted, as annotation data, and the electronic information display control unit, in response to a fact that the at least one annotation object has been selected through the annotation operation control unit, displays a page of the electronic information on a screen based on the displaying magnification and the displaying position held in annotation data corresponding to the at least one annotation object selected.

8 Claims, 20 Drawing Sheets

— · — ▶ : COPYING OPERATION OF OBJECT

DISPLAY CONTROL OF PAGE DATA BY ANNOTATION SELECTION

CROSS-REFERENCE TO RELATED APPLICATIONS

This application is based on and claims priority under 35 U.S.C. 119 from Japanese Patent Application No. 2008-225248 filed Sep. 2, 2008.

BACKGROUND

1. Technical Field

This invention relates to an information processing apparatus, an information processing method, and a computer readable medium.

2. Related Art

In a system for displaying and editing a general electronic document, in displaying it on a display screen, according to a purpose of reference and edition, the displaying magnification is usually changed. In such a system, the function of magnifying and reducing the displayed image is indispensable. For example, a large-format electronic document like A0 or A1, as it is isometric, cannot be fallen within the display screen. So, when it is desired to ascertain the image of the entire electronic document, the image is reduction-displayed; on the other hand, in executing edition work, the spot to be edited is somewhat magnified to display the details of a character and graphic. In this way, as required, by choosing reduced display or magnified display of the electronic document, workability of document editing processing can be enhanced.

SUMMARY

According to an aspect of the present invention, an information processing apparatus includes: an operation input unit that receives a user's operation for electronic information; an electronic information display control unit that displays a page of the electronic information constructed of a single page region on a screen; an electronic information operation control unit that executes an operation for the electronic information containing a change in displaying magnification or displaying position for the page of the electronic information displayed on the screen according to the user's operation through the operation input unit or an instruction other than the user's operation; an annotation operation control unit that executes an operation for at least one annotation object on the page of the electronic information displayed on the screen according to the user's operation through the operation input unit or the instruction other than the user's operation; and an electronic information data holding unit that holds the page data relative to each page of the electronic information, wherein the annotation operation control unit, in a case where the at least one annotation object is pasted on a page, holds a displaying magnification of the page on which the at least one annotation object is pasted and a displaying position on the page on which the at least one annotation object is pasted, as annotation data, and the electronic information display control unit, in response to a fact that the at least one annotation object has been selected through the annotation operation control unit, displays the page of the electronic information on the screen based on the displaying magnification and the displaying position held in annotation data corresponding to the at least one annotation object selected.

BRIEF DESCRIPTION OF THE DRAWINGS

Exemplary embodiment of the present invention will be described in detail based on the following figures, wherein.

DETAILED DESCRIPTION

Hereinafter, referring to drawings, a detailed explanation will be given of an embodiment of this invention.

Figure 1:
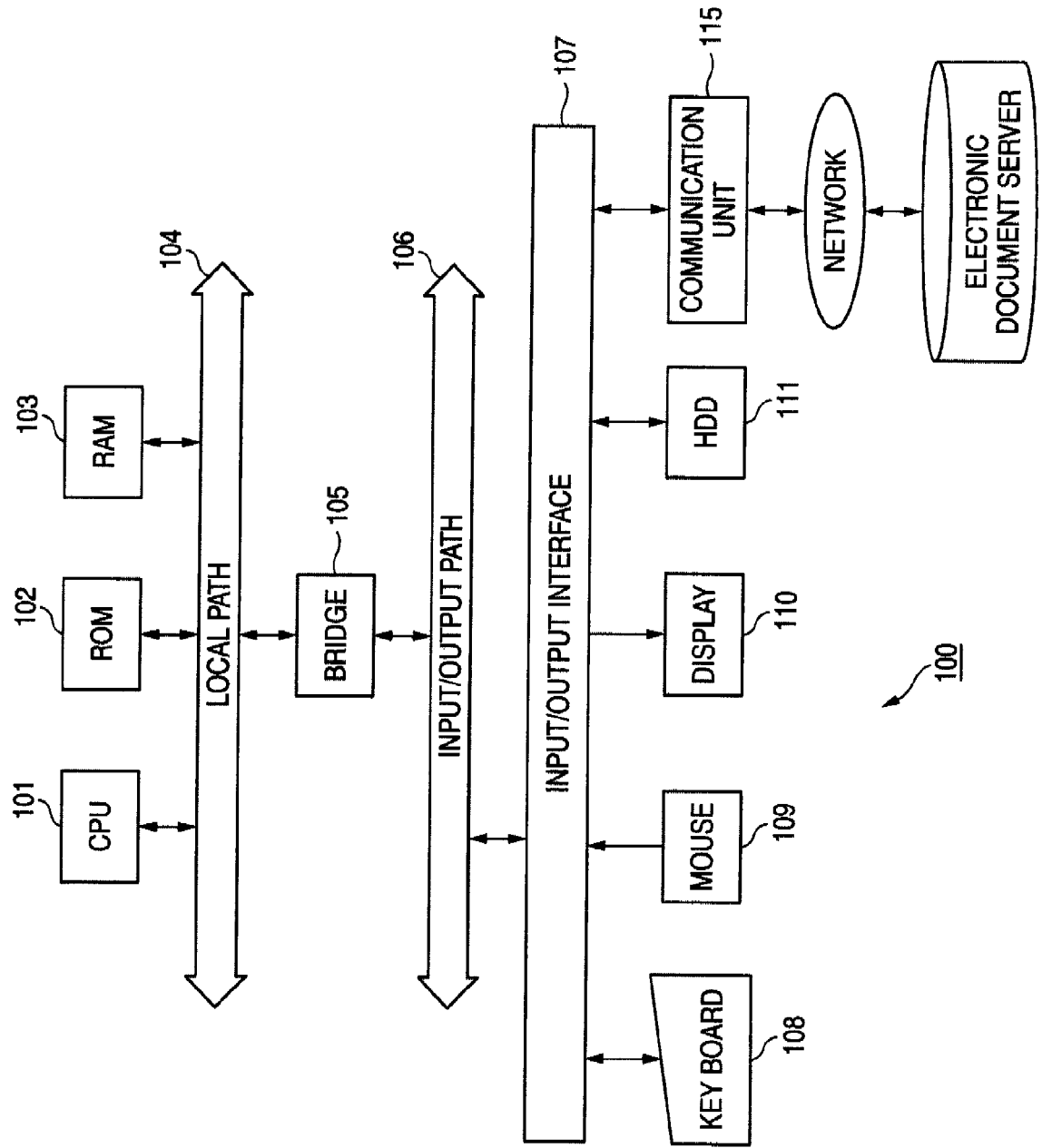
FIG. 1 is a view showing the configuration of a computer 100 which operates as a document processing device.

FIG. 1 shows the configuration of a computer 100 which operates as a document processing device serving as an information processing apparatus.

A CPU 101 executes programs stored in a ROM 101 and an HDD (Hard Disk Drive) 111 under a program executing environment provided by an OS (Operating System).

A ROM (Read Only Memory) 102 constantly stores a program code such as a POST (Power On Self Test) or a BIOS (Basic Input Output System). A RAM (Random Access Memory) 103 is used to load the program stored in the ROM 102 or HDD 111 when the CPU 101 execute it, and to temporarily save the working data of the program being executed. These components are connected with one another by a local path 104 directly connected to the local pin of the CPU 101.

The local path 104 is connected to an input/output bus 106 such as a PCI (Peripheral Component Interconnect) through the bridge 105.

A keyboard 108 and a pointing device 109 such as a mouse are an input device operated by a user. A display 110 is an LCD (Liquid Crystal Display) or a CRT (Cathode Ray Tube). The user now referred to is a document editor who executes the work of pasting an annotation object on the noted spot in an electronic document, or referring to or editing the electronic document with a clue of the annotation object.

The HDD 111 is a drive unit incorporating a hard disk serving as a recording medium and driving the hard disk. The hard disk is used to install the programs executed by the CPU 101 such as the operating system or various applications and to save various local files. The application program installed in the HDD 111 is e.g. document management software. Further, in this embodiment, the HDD 111 is used as a place for storing the electronic document or information attendant thereon.

A communication unit 115 is connected to a network to execute the communication with other information processing apparatus. For example, the communication unit 115 can be also connected to an electronic document server storing an electronic document through the network.

The document processing device can be constructed in such a manner that the document management software dealing with the electronic document is executed on the computer 100. Now, it is assumed that the electronic document has a page size indicative of any spot to be managed and can specify the position on the page by a page coordinate system (For example, with the left upper end of the page located at an origin, an X-axis and Y-axis are set rightward and leftward, respectively).

Further, the document processing device according to an embodiment of this invention can paste an annotation object on any position on the page of the electronic document without exerting any influence on the text of the electronic document. The annotation object is electronic information represented in such a manner as a tag pasted to any position on the page of the electronic document and a marker drawn along the text by handwriting. The annotation object is displayed in the above manner and can be operated by an operation input unit. By pasting the annotation object to any position on the page of the electronic document to explicitly point out location of a noted spot, the work of referring to/editing by the user can be supported.

Figure 2:
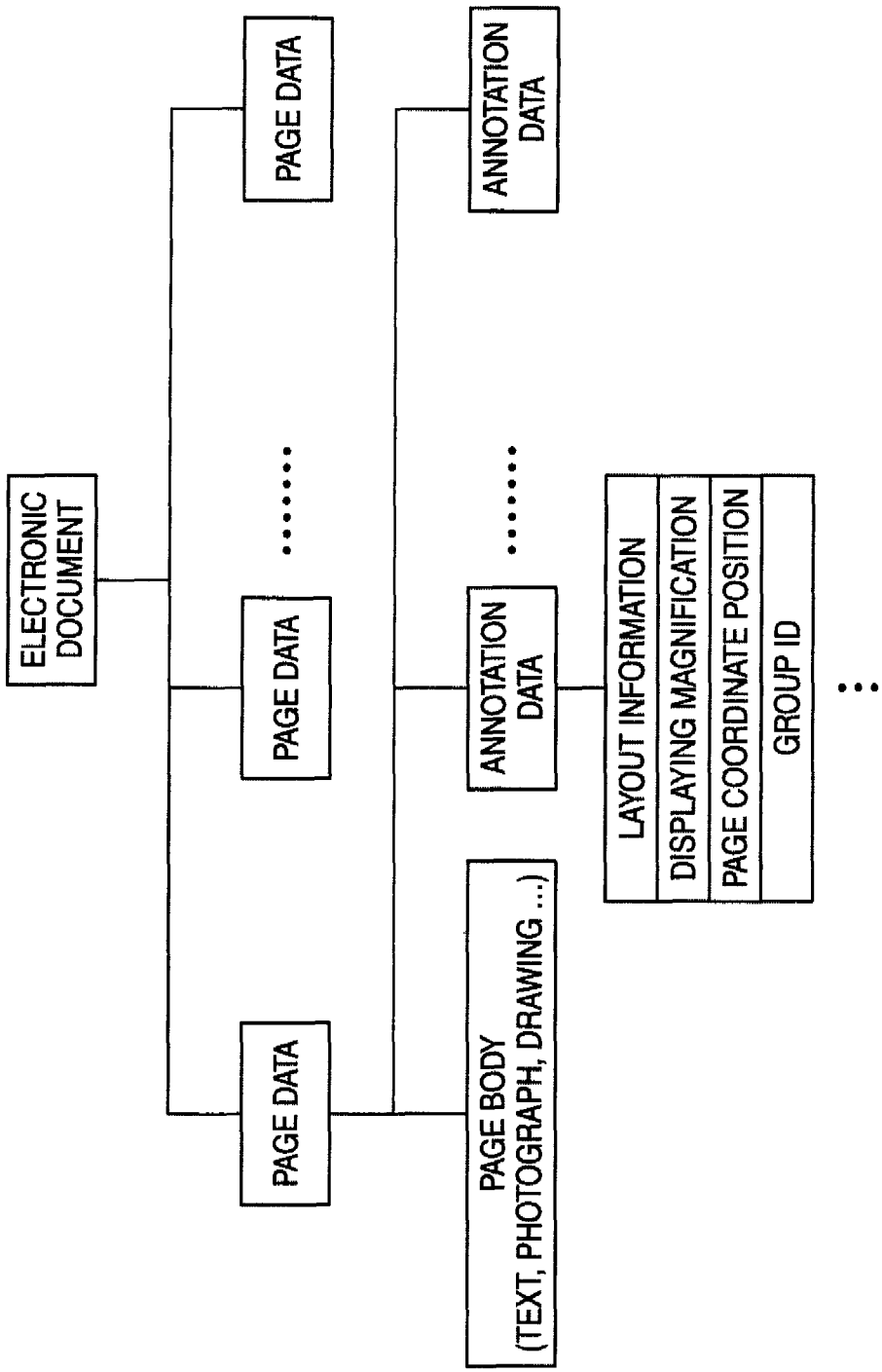
FIG. 2 shows the data structure of an electronic document stored in a storage unit 10.

FIG. 2 shows the data structure of the electronic document to be handled by the document processing device according to this embodiment. The electronic document is handled as a data file on the computer 100. A single electronic document consists of one or more pages. As shown, the electronic document data contain page data corresponding to the number of pages.

The page data corresponding to one page consist of text data (or image data such as a photograph or graphic) corresponding to the page body of the electronic document and annotation data for each of annotation objects pasted on the displayed image of the pertinent page. In this way, since the data corresponding to the electronic document body and the annotation data are separately handled, the annotation object can be pasted on each page without exerting an influence on the data of an original electronic document.

The annotation data set for the annotation object conventionally include the layout information of the noted spot pasted on the page. On the other hand, in this embodiment, in addition to the layout information of the noted spot, the information on the displaying position of the page when the annotation object is pasted on the page and displaying magnification of the displayed page is written in the annotation data as the information for reproducing the page display. The displaying position of the page can be described in terms of the displaying range of the page being displayed at present or a page coordinate position serving as or center of the displaying range (other specific positions within the displaying range). It is evident that by aligning the displaying position of the page serving as the center of the displaying range and also adopting the same displaying magnification, the page display when the annotation object is pasted can be reproduced.

Further, as an option, a group ID can be contained within the annotation data. For example, for the annotation objects pasted on plural noted spots desired to be recognized simultaneously in the editing work, the annotation data having the same group ID are set, thereby permitting the noted spots to be grouped.

On the document processing device according to this embodiment, a copying operation is provided as one of the editing processing operations for the annotation object. When the annotation object pasted on a certain noted spot on the page is copied onto e.g. another place within the same page or another page within the same document, the displaying magnification and group ID are copied as they are.

When the electronic document is saved, as a part of the page data of the electronic document, the setting contents (i.e. annotation data) of the annotation object pasted on the page are also saved. Further, when the electronic document is read, a part of the page data of the electronic document, the annotation data pasted on the page are also read out.

Figure 3:
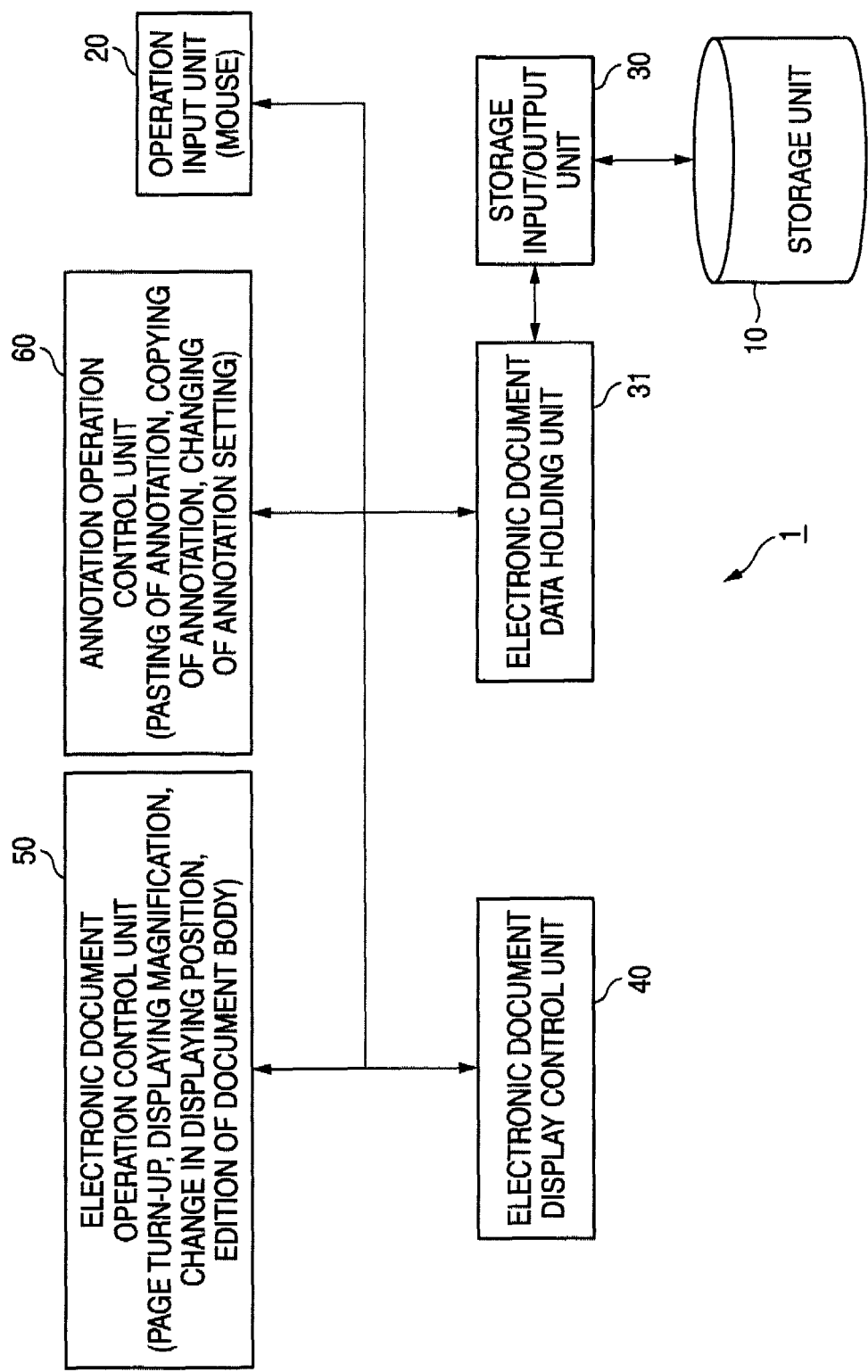
FIG. 3 is a view schematically showing the functional structure of the document processing device for pasting an annotation object on the electronic document and displaying the electronic document pasted with the annotation object thereon.

FIG. 3 schematically shows the functional structure of the document processing device for pasting the annotation object on the electronic document and displaying the electronic document pasted with the annotation object.

A document processing device 1 as shown includes a storage unit 10 for storing the electronic document; an operation input unit (I/F) 20 for inputting a user's operation through a user interface such as the mouse 109; a storage input/output unit 30 for reading or writing the electronic document for the storage unit 10; an electronic document data holding unit 31 for holding the data of the electronic document (which is now a processing target) read from the storage unit 10; an electronic document display control unit 40 for executing the processing of displaying the page of the electronic document on the display screen; an electronic document operation control unit 50 for executing the operation for the electronic document displayed on the display screen; and an annotation operation control unit 60 for executing the operation of the annotation object on the page of the electronic document.

The storage input/output unit 30, electronic document operation control unit 50 and annotation operation control unit 60 basically launch the corresponding processing operations according to instructions through the operation input unit 20.

The storage input/output unit 30 reads out, from the storage unit 10, the data of the electronic document designated as a processing target and writes them in the electronic document data holding unit 31. If saving of the electronic document being processed is instructed, the storage input/output unit 30 also writes the data of the electronic document held in the electronic document data holding unit 31 in the storage unit 10. The electronic document held in the electronic document data holding unit 31 has such a data structure as shown in FIG. 2. In saving the electronic document in the storage unit 10, as a part of the page data of the electronic document, the annotation data pasted on each page are also saved. Further, in reading out the electronic document from the storage unit 10, as a part of the page data of the electronic document, the annotation data pasted on the page are also read out. Now, the storage unit 10 is a local storage region within the computer 100 such as the HDD 111, but may be certainly an electronic document server accessible through the communication unit 115.

The operations for the electronic document to be executed by the electronic document operation control unit 50 include the operations such as changes in the page displaying magnification and displaying position, page movement and edition of the document (addition, correction and deletion of the text data). The contents of the operation for the electronic document executed by the electronic document operation control unit 50 are appropriately reflected on the corresponding page data within the electronic document written in the electronic document data holding unit 31.

The operations of the annotation object to be executed by the annotation operation control unit 60 include editing operations such as pasting of a new annotation object on a desired place (e.g. noted spot) of the page being displayed, selection of the annotation object pasted on the page, and copying or change in the setting contents of the annotation object within the page or between pages. Now, where the annotation object pasted on a certain spot of the page is copied and also pasted on one or more noted spots, the annotation object thus copied has a displaying position at a copying destination but its displaying magnification and group ID are copied as they are. Namely, by repeating the copying operation of the annotation object, the user can group plural noted spots as desired to be recognized simultaneously. The contents of the operation for the annotation object executed by the annotation operation control unit 60 are appropriately reflected on the corresponding page data within the electronic document written in the electronic document data holding unit 31.

On the basis of the analysis result of the data structure (see FIG. 2) of the electronic document held in the electronic document data holding unit 31, the electronic document display control unit 40 executes the control of creating a displayed image of the page of the electronic document and displaying it onto the display screen. The contents of operations by the electronic document operation control unit 50 and annotation operation control unit 60 are appropriately reflected on the data of the electronic document (described above) so that the displayed image of the page created corresponds to the newest operation such as the page movement, changes in the displaying magnification and page displaying position and pasting, movement and copying of the annotation object.

Figure 4:
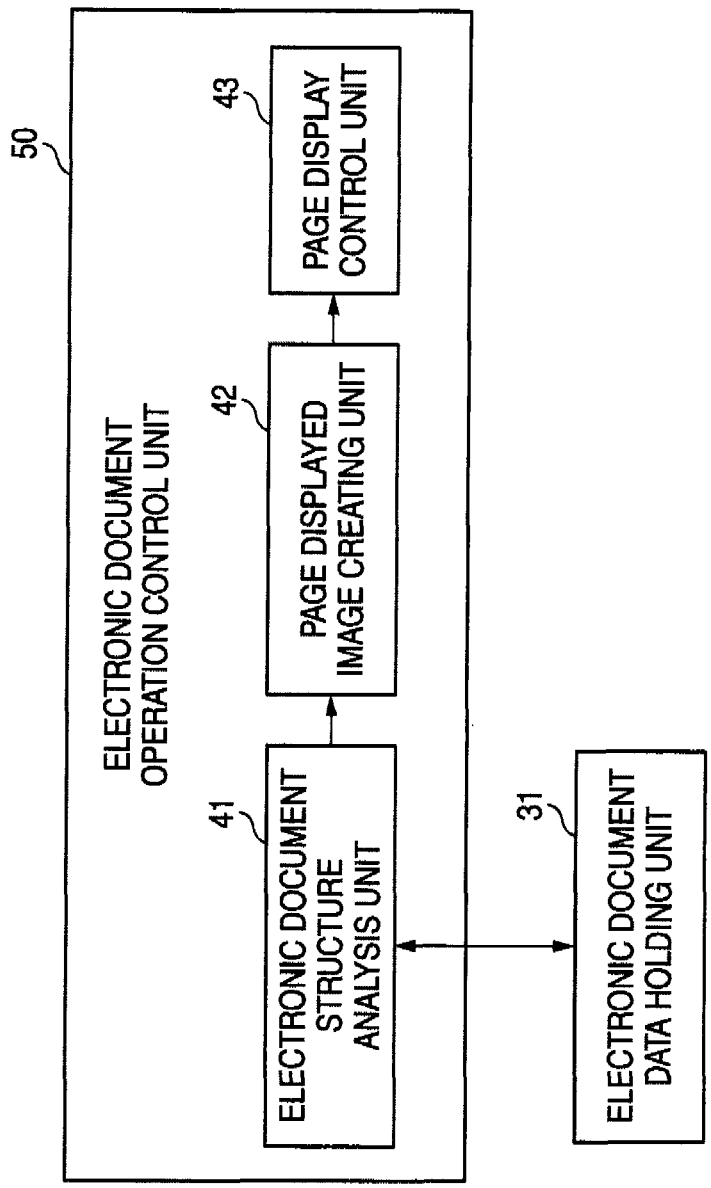
FIG. 4 is a view showing a typical internal configuration of an electronic document display control unit 40.

FIG. 4 shows the internal configuration of the electronic document display control unit 40. The electronic document display control unit 40 as shown includes an electronic document structure analysis unit 41 for analyzing the data structure of the electronic document held in the electronic document data holding unit 31, a page displayed image creating unit 42 for creating the displayed image of the page of the electronic document on the basis of the analysis result of the data structure of the electronic document, and a page display control unit 43 for displaying the page displayed image onto the display screen.

The page displayed image creating unit 42 creates the page displayed image of the electronic document. The page displayed image creating unit 42 also creates a displayed annotation object pasted on the corresponding page of the electronic document and creates the page displayed image with the annotation objection pasted in the pertinent page. Further, in response to the fact that the annotation object has been selected by the user through the operation input unit 20, the electronic document structure analysis unit 41 refers to the corresponding annotation data in the page data and the page display control unit 42 creates the page displayed image on the basis of the reference result of the annotation data. The details of this will be described later.

The user can execute the operation through the operation input unit 20 for the page displayed onto the display screen by the electronic document display unit 40. In response to such a user's operation, the annotation operation control unit 60 serving as an annotation editing function unit can newly paste the annotation object and change the setting contents of the annotation.

Further, the user can select the annotation object pasted on the page through the operation input unit 20. In response to the selecting operation of the annotation object, the processing according to the contents set for the pertinent annotation object is launched. For example, the page displayed image creating unit 42 changes the displaying magnification of the page being displayed and jumps the displaying position of the page (displaying range of the page or page coordinate position being its center). The details of this will be described later.

Figure 5:
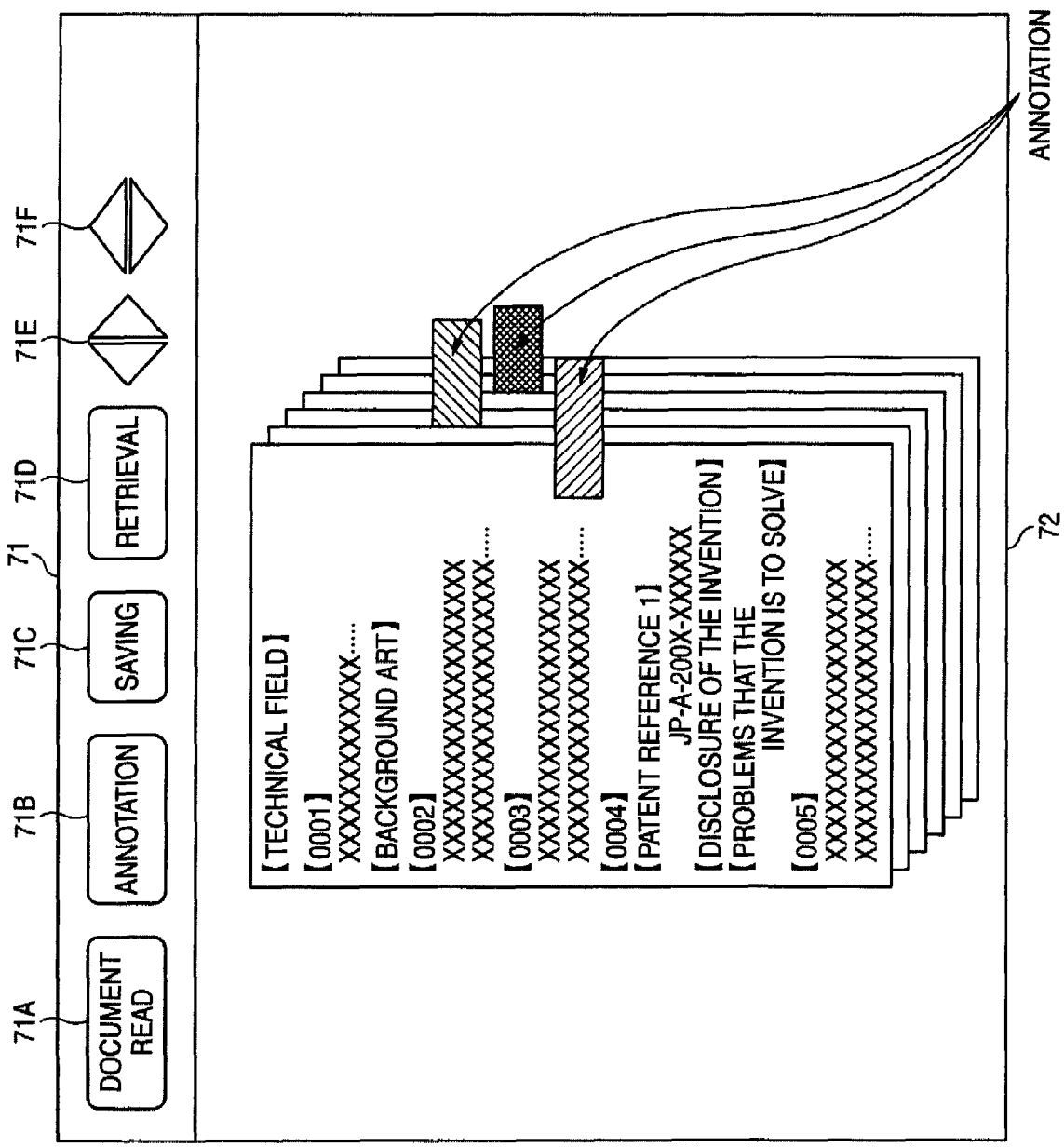
FIG. 5 is a view showing a typical screen configuration relative to the annotation editing operation which is displayed onto a display screen by the document data displaying unit 23.

FIG. 5 shows a typical screen configuration for the annotation editing operation which is displayed onto the display screen by the electronic document display control unit 40.

The display screen as shown includes a button displaying area 71 where plural buttons having the corresponding roles, respectively and a document displaying area 72 which is an area for displaying the electronic document consisting of one or plural pages.

The displaying magnification of the page of the electronic document displayed within the document displaying area 72 can be set optionally (or from plural grades). The page of the electronic document displayed in the document displaying area 72 serves as a target for which the annotation object is pasted (FIG. 5 illustrates a state where annotation objects are pasted on some pages of the electronic document consisting of plural pages). The displaying position (displaying range of the page or page coordinate position being its center) of the page being displayed within the document displaying area 72 can be moved for example, by drugging the page image using the mouse 109.

The plural buttons arranged in the button displaying area 71 are a "document reading" button 71A, an "annotation" button 71B, a "saving" button 71C, a "retrieval" button 71D, a "page movement" button 71E, a "zoom" button 71F, etc. However, the gist of this invention is not limited to a specific combination of plural buttons arranged in the button displaying area 71 but the kinds of the buttons can be appropriately changed according to the intention of a software designer or changes in the setting by the user.

By pointing-designating each button within the button displaying area 71 using the keyboard 108 or mouse 109, the user permits the function allotted to the pertinent button to be executed.

When the document reading button 71A is designated, the storage input/output unit 30 is launched to take out the electronic document stored in the storage unit 10. The electronic document thus taken out is written in the electronic document data holding unit 31. Further, on the basis of the analysis result of the data structure (see FIG. 2) of the electronic document held in the electronic document data holding unit 31, the electronic document display control unit 40 executes the control of creating a displayed image of the page of the electronic document and displaying it onto the display screen.

When the annotation button 71B is designated, the annotation operation control unit 60 is launched so that a new annotation object can be pasted to a desired place on the page being displayed and the annotation object can be copied. The annotation object is a displayed object such as a tag pasted on the page of the electronic document or a marker drawn along the text. A dialogue box for designating the setting contents (annotation data) of the annotation object appears, but is not illustrated here since the method of designating is arbitrary. The operation contents of the annotation object by the annotation operation control unit 60 are reflected on the corresponding page of the electronic document held in the electronic document data holding unit 31 and the display of the electronic document within the document displaying area 72 is also updated.

By pasting the annotation object on the page of the electronic document being displayed within the document displaying area 72, the user can indicate a noted spot on the page. Further, in this embodiment, since the annotation data containing the displaying magnification and displaying position of the page when the annotation object is pasted are saved in the annotation data themselves or page data, when the annotation object is selected afterward, the displaying state of the same page as when the annotation object is pasted can be reproduced.

When the saving button 71C is designated, the storage input/output unit 30 is launched to write the data of the electronic document held in the electronic document data holding unit 31 into the storage unit 10. In saving the electronic document in the storage unit 10, as apart of the page data of the electronic document, the annotation data pasted on each page are also saved.

Figure 6:
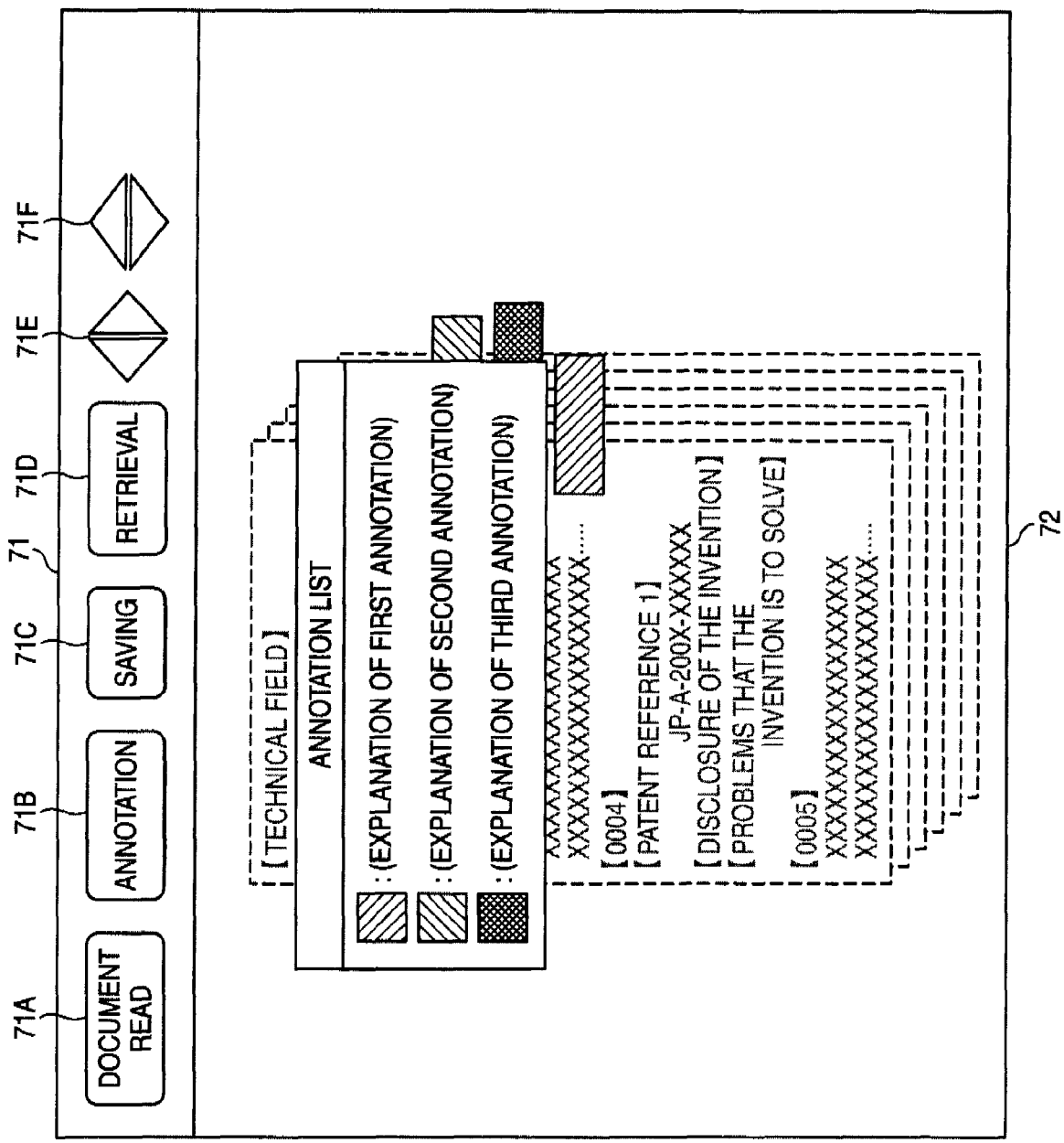
FIG. 6 is a view showing a typical screen configuration where annotation objects are list-displayed.

When the retrieval button 71D is designated, the annotation operation control unit 60 is launched to retrieve the annotation data contained in the electronic document and list-display them within the document displaying area 72. FIG. 6 illustrates the situation where the annotation objects are list-displayed within the document displaying area 72. Using this list display as an index list, the user can select any annotation object so that the displaying position can be jumped to the page where the annotation object is pasted (described later).

Figure 7:
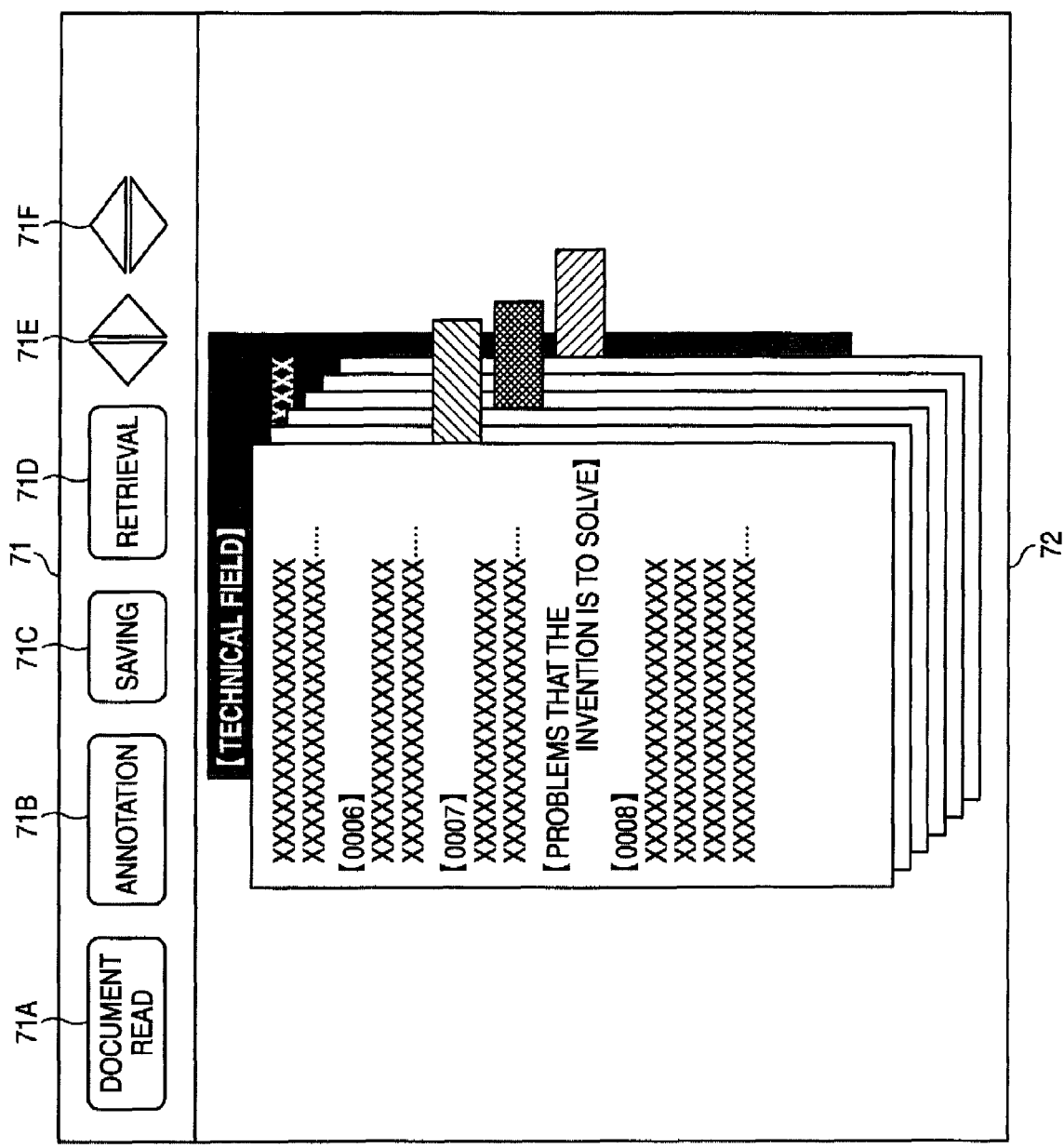
FIG. 7 is a view showing the situation where the electronic within a document displaying area shown in FIG. 5 has been turned up rearward by one page.

The page movement button 71E is constructed of a combination of a previous page feeding button and a subsequent page feeding button. When the previous page feeding button or subsequent page feeding button is designated, the page movement displaying function of the electronic document operation control unit 50 is launched so that the page of the electronic document is moved forward or rearward by the number of time having operated the pertinent button. Using this page movement display function to display the information of a desired page within the document displaying area 72, the user can swiftly retrieve a desired item of information from a large number of items of information taken in. The operation contents of the page movement by the electronic document operation control unit 50 are reflected on the data held in the electronic document data holding unit 31 and further the display within the document displaying area 72 is shifted to that of the page turned up. In the document displaying area 72 in FIG. 5, a top page of the electronic document is displayed on the foremost plane; on the other hand, shown in FIG. 7 is the manner when the electronic document within the document displaying area 72 shown in FIG. 5 is shifted rearward by one page.

Figure 8:
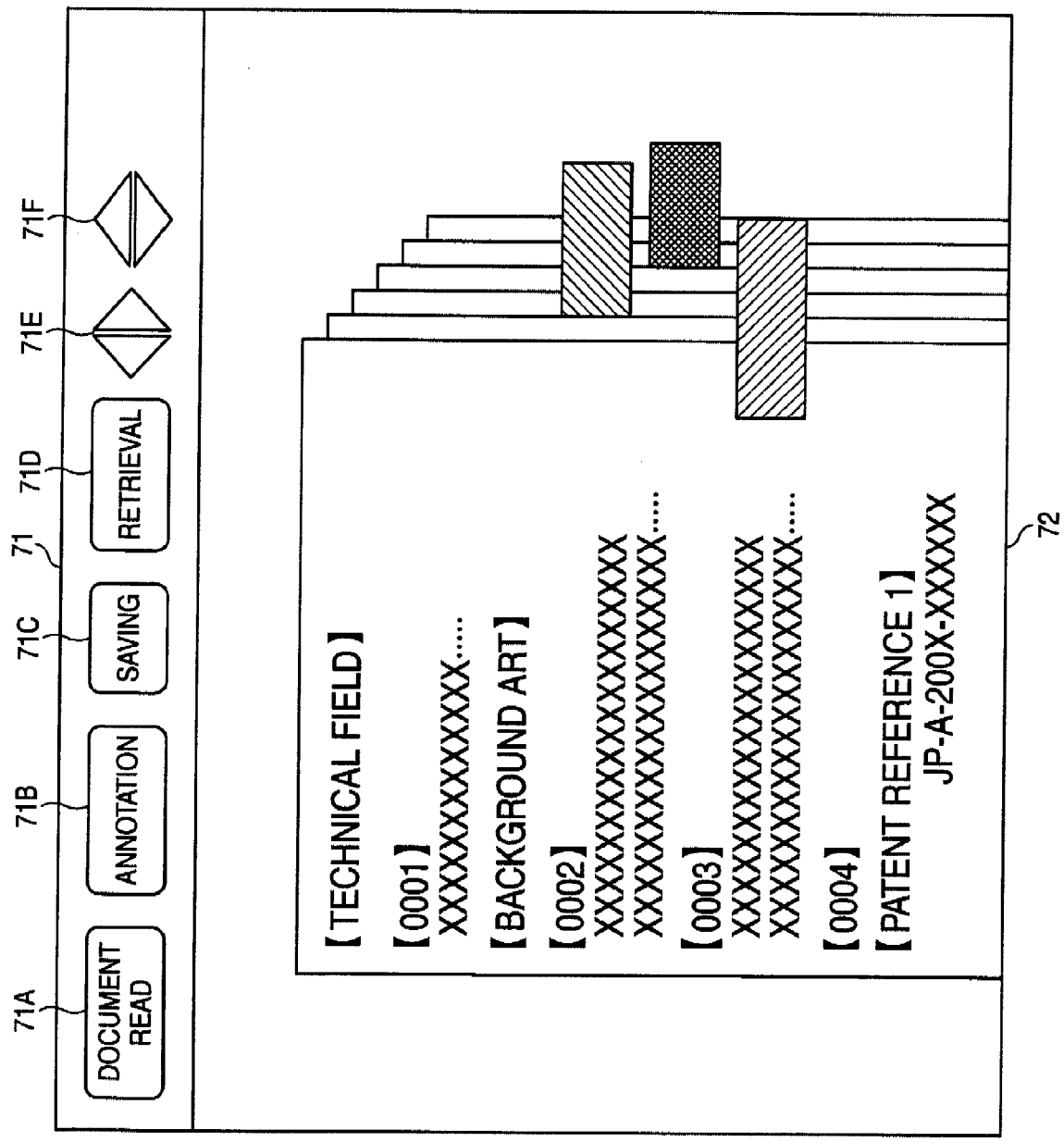
FIG. 8 is a view showing the situation where the displaying magnification of the page of the electronic document 72 shown in FIG. 5.

The zoom button 71F is constructed of a combination of a zoom-up button and a zoom-down button. When the zoom-up button or zoom-down button is designated, the electronic document operation control unit 50 is launched so that the displaying magnification of the page being displayed within the document displaying area 72 is increased or decreased according to the quantity of having operated the pertinent button. The increase or decrease in the displaying magnification by the electronic document operation control unit 50 is reflected on the data held in the electronic document data holding unit 31, and further the display within the document displaying area 72 is shifted to that of the page with the displaying magnification after increased or decreased. Shown in FIG. 8 is the situation where the displaying magnification of the page of the electronic document within the document displaying area 72 shown in FIG. 5 has been increased.

It should be noted that the document editing function of the electronic document operation control unit 50 may be built in the document management software or may be installed as another application software in the computer 100. If this document editing function is launched, the user can execute the editing operation in a state where the page of the electronic document to be edited is being displayed within the document displaying area 72.

Further, in the document processing device according to this embodiment, plural screens can be displayed within the document displaying area 72. As a displaying format, the document displaying area 72 may be divided in plural screens to be aligned, or the plural screens may be displayed superposedly. Displayed on each screen is the page to be edited simultaneously in each of different electronic documents or each page to be edited simultaneously in the same electronic document.

Figure 9:
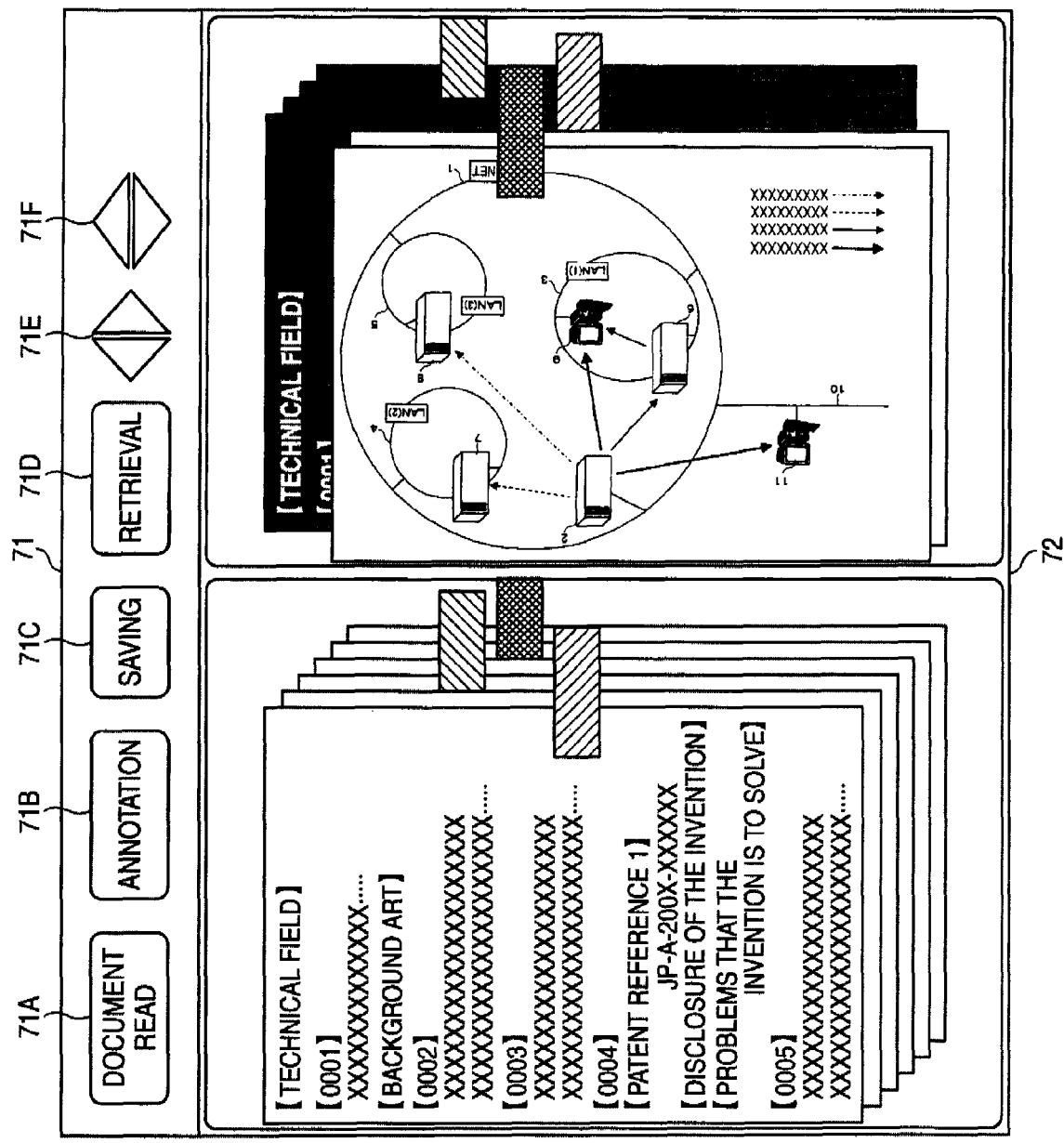
FIG. 9 is a view showing the situation where the document displaying area 72 is divided into two screens on which the different pages within the electronic document are displayed, respectively.

FIG. 9 illustrates the situation where the document displaying area 72 is divided in two screens where the different pages within the electronic document are displayed, respectively. For example, where two or more annotation objects are selected simultaneously, such screen division is made so that the corresponding plural pages (or noted spots) are simultaneously displayed for easiness of comparison.

For example, the user can also simultaneously select plural annotation objects from such a list-display of the annotation objects as shown in FIG. 6. When two or more annotation objects are selected simultaneously, such screen division is made so that the corresponding plural pages (or noted spots) are simultaneously displayed for easiness of comparison. If the annotation objects at the first and the third line are simultaneously selected from the list display as shown, as shown in FIG. 9, the document displaying area 72 is divided into two screens where the pages with the corresponding annotation objects pasted are displayed, respectively (in the same page displaying state as when the annotation objects are pasted). Thus, the user can make efficient the operation of retrieving the noted spots correlated with each other (or simultaneously becoming target objects) so that the plural noted spots can be simultaneously compared).

Traditionally, it was general that the page pasted with the annotation object is displayed at a default displaying magnification and within a default displaying range (at the page coordinate position to be its center). On the other hand, in this embodiment, by taking out the displaying magnification and page coordinates recorded in the annotation data corresponding to the annotation object selected, the page displayed image creating unit 42 creates the page image at this displaying magnification and sets its page coordinates at the center of the displaying range. The displayed image thus created is displayed onto the display screen. Accordingly, on the basis of the page coordinates and displaying magnification recorded in the annotation data, the displaying manner when the annotation object has been pasted can be reproduced.

Figure 10:
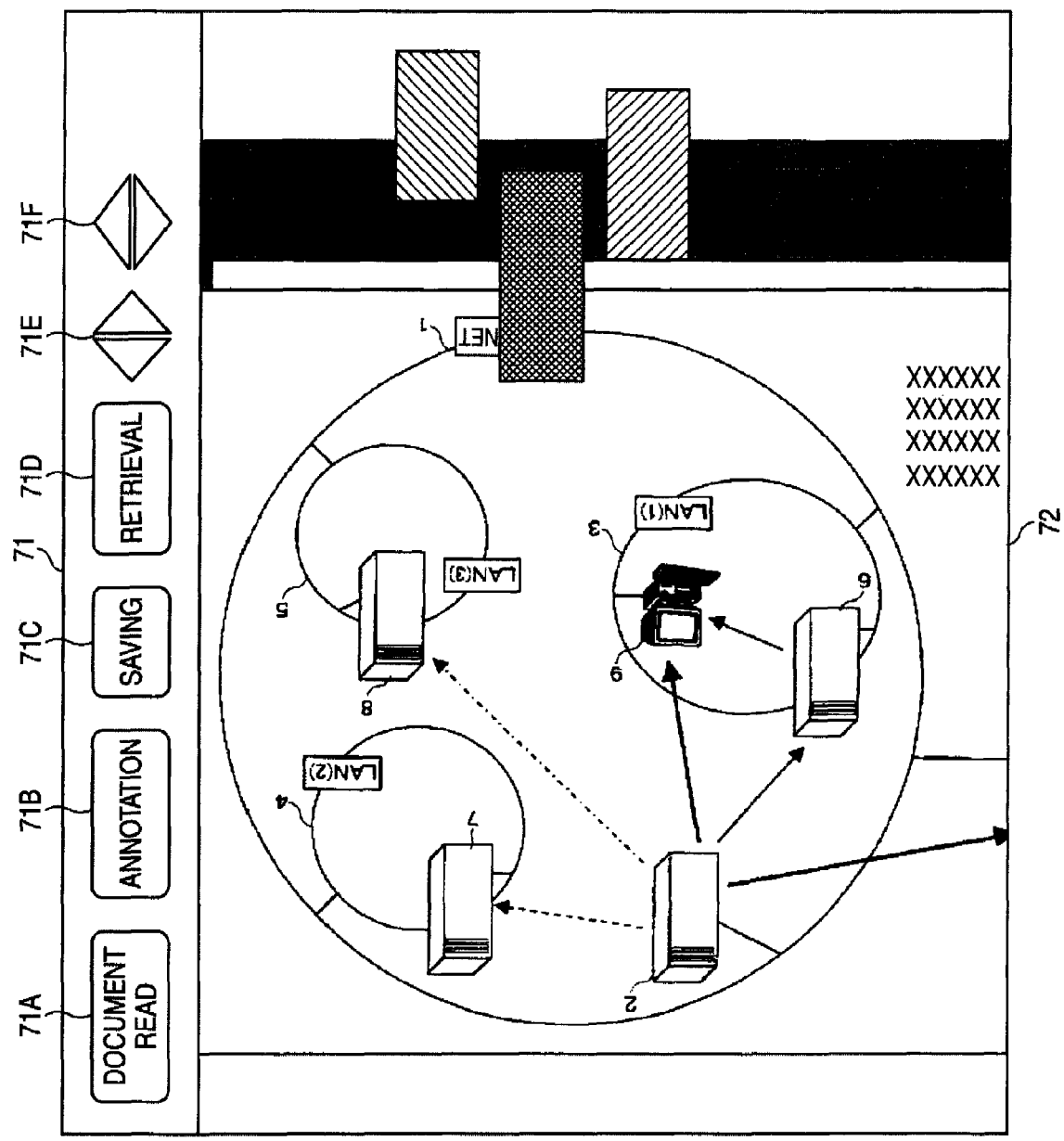
FIG. 10 is a view for explaining the mechanism of reproducing, on the basis of the page coordinates and displaying magnification recorded in annotation data, the displayed image of the page when the annotation object has been pasted.

For example, it is assumed that the rearmost (third) annotation object of the electronic document displayed within the document displaying area 72 in FIG. 5 has been pasted on the page with the displaying magnification and displaying position of the page as shown in FIG. 10. In this case, if the rearmost annotation object is selected in the document editing operation executed afterward (through the annotation list display in FIG. 6), the same displaying screen as FIG. 10 will be reproduced.

Figure 11:
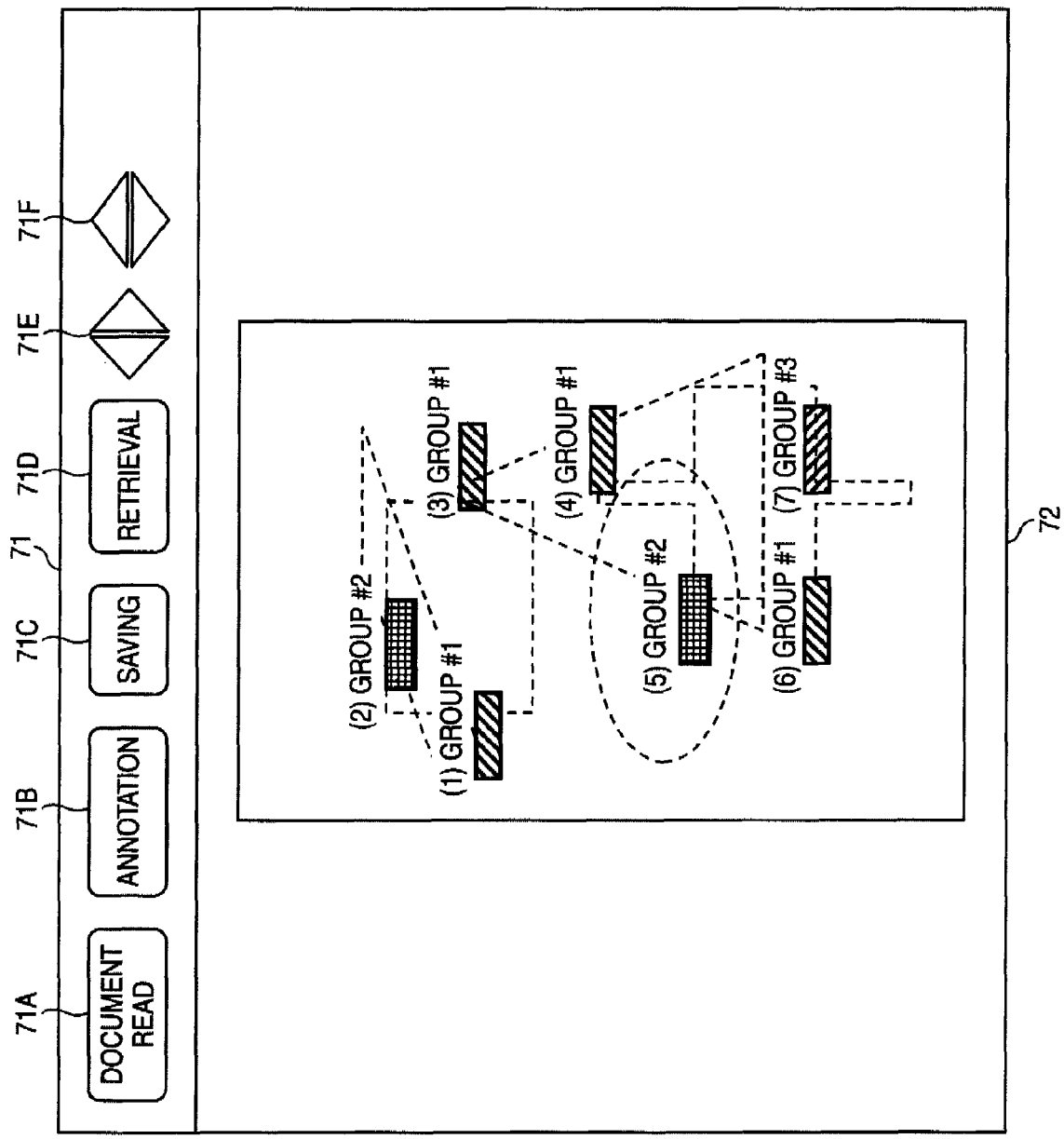
FIG. 11 is a view showing a typical screen configuration displaying the electronic document in which the annotation objects are pasted at plural noted spots on a large-format drawing.

FIGS. 5 to 9 illustrate the manners where the annotation objects are pasted on some pages of the electronic document consisting of plural pages within the document displaying area 72. As another example of the electronic document, there is a drawing having a large-format page size like A0 or A1. FIG. 11 illustrates a displayed example of the electronic document in which the annotation objects are pasted at plural noted spots on the large-format drawing. The screen as shown corresponds to a viewer provided by the document management software like FIG. 5 and others. Incidentally, it should be understood that in the drawing displayed, the annotation objects with the same shading have the same group ID.

In the case such as FIG. 11, if the large-format drawing is expansion-displayed, the pertinent noted spot becomes easy to see, but difficult to know the position in the page. Inversely, if the large-format drawing is reduction-displayed, the characters or drawing are crushed to become difficult to see, but easy to know the positional relationship among the plural noted spots with the annotation objects pasted thereon. However, to retrieve a desired noted spot by repeating the expansion-display and reduction-display of the large-format drawing is not an efficient operation.

On the other hand, in the document processing device according to this embodiment, given as the indispensable information of the annotation data are the page coordinates and displaying magnification of the displayed page when the annotation has been pasted. Therefore, according to the operation of selecting the annotation object, the page display when the annotation object has been pasted can be reproduced. Thus, the user can make efficient the editing operation of the electronic document.

Figure 12:
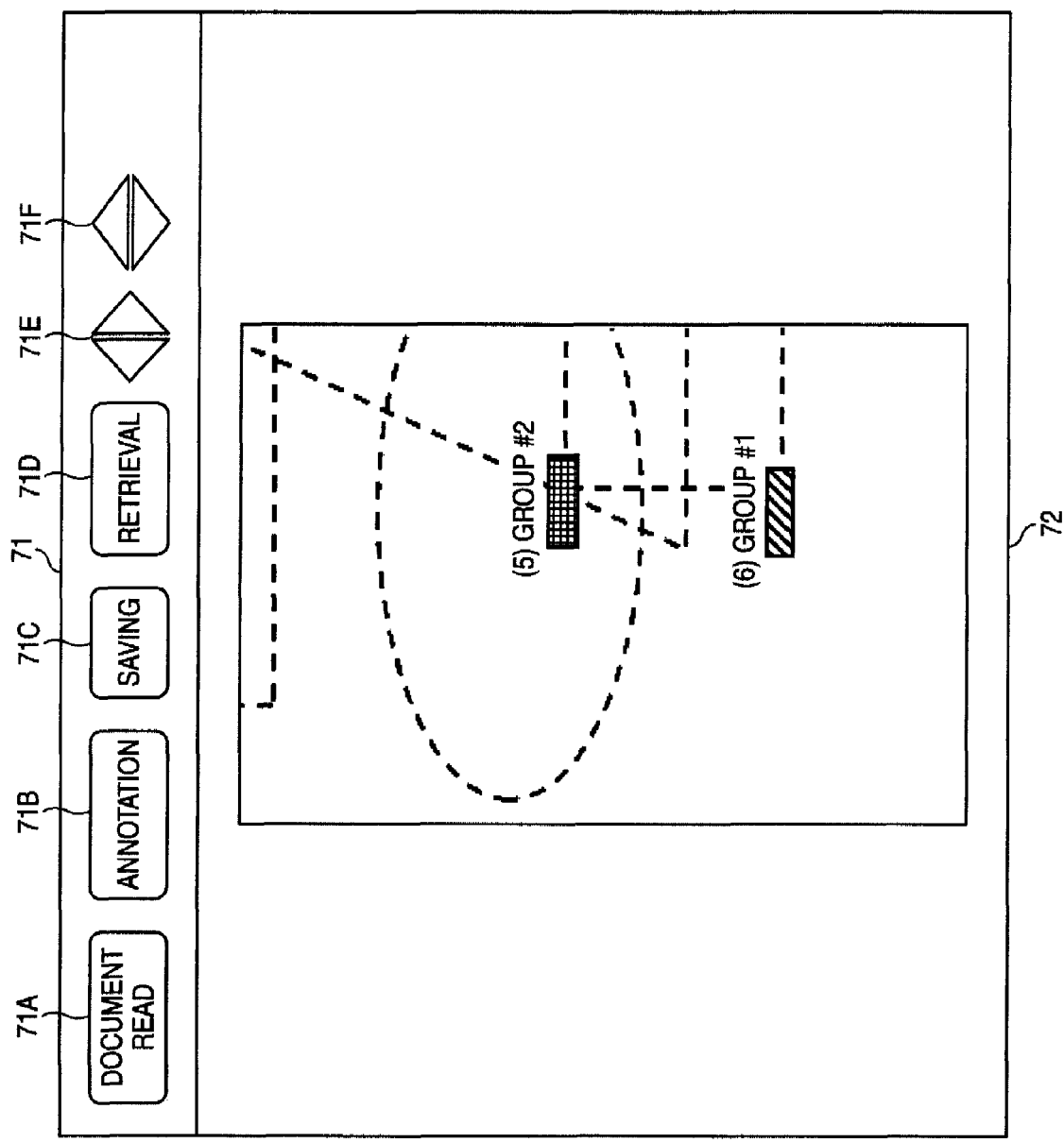
FIG. 12 is a view for explaining the mechanism of reproducing, on the basis of the page coordinates and displaying magnification recorded in annotation data the displayed image of the page when an annotation object has been pasted.
Figure 13:
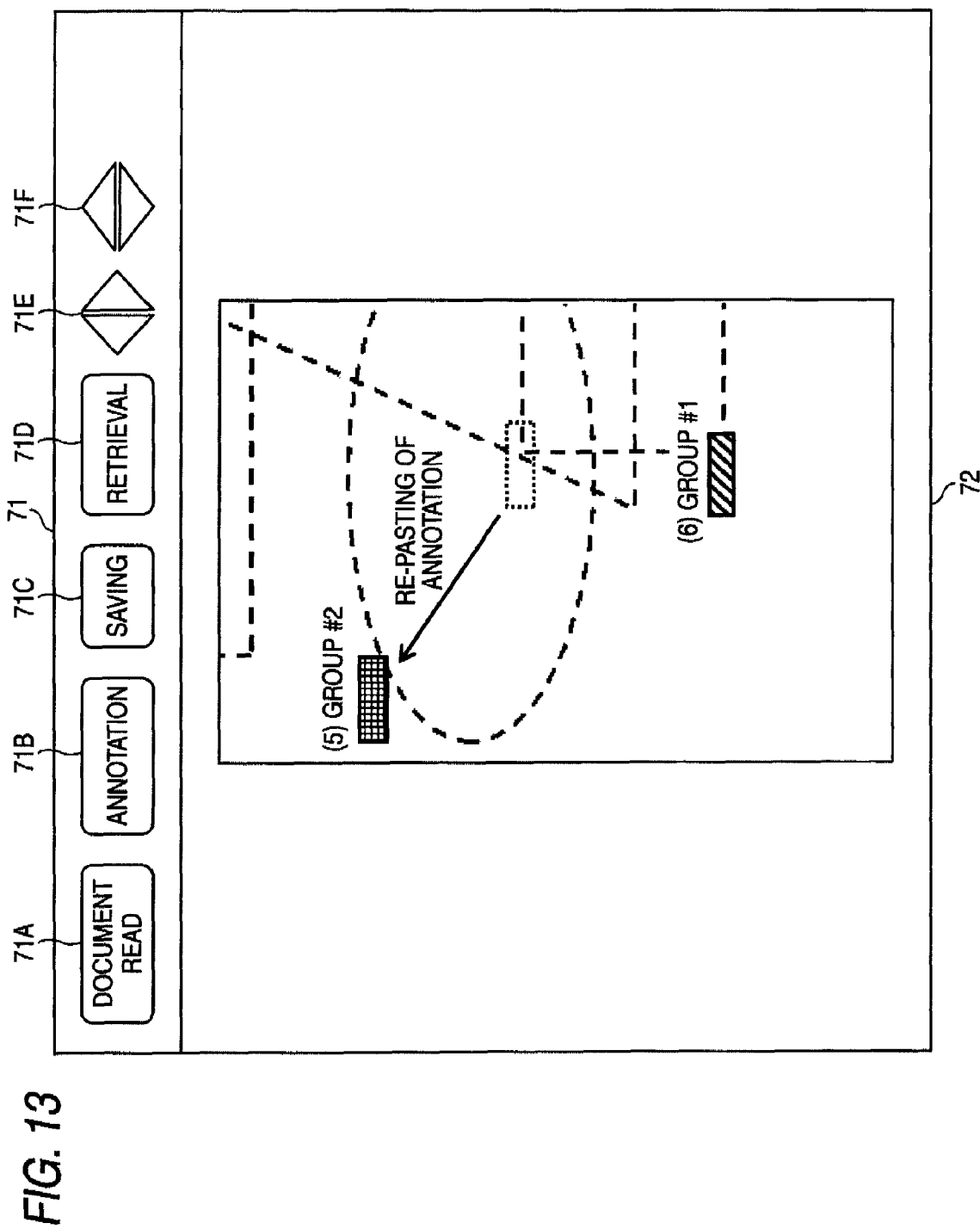
FIG. 13 is a view for explaining the mechanism of reproducing, on the basis of the page coordinates and displaying magnification recorded in annotation data the displayed image of the page when an annotation object has been pasted.

For example, it is assumed that the fifth annotation object of the electronic document displayed within the document displaying area 72 in FIG. 11 has been pasted on the page with the displaying magnification of the page and its displaying position on the page as shown in FIGS. 12 and 13. In this case, if the fifth annotation object is selected in the document editing operation executed afterward (through the reduction-display screen glancing over the entire large-format page as shown in FIG. 11), the same displaying screen as FIGS. 12 and 13 will be reproduced.

Incidentally, the displaying range of the page to be jumped in response to the fact that the annotation object has been selected is determined by its displaying position on the page and page displaying magnification when the annotation object has been pasted. Therefore, after the displaying range is jumped, the display will not be changed by re-pasting the annotation object as shown in FIG. 13. For example, even when the spot concealed by the annotation object is viewed, the annotation object can be light-heartedly moved on the page to refer to the concealed spot.

Further, with the group ID being made valid, when the user select a certain annotation object, its displaying position is not only expansion-displayed but also the plural displaying positions where the annotation objects with the same group ID are pasted are simultaneously expansion-displayed. Thus, the user can make efficient the operation of searching the noted spots correlated with one another and also simultaneously compare the plural noted spots with one another.

Figure 14:
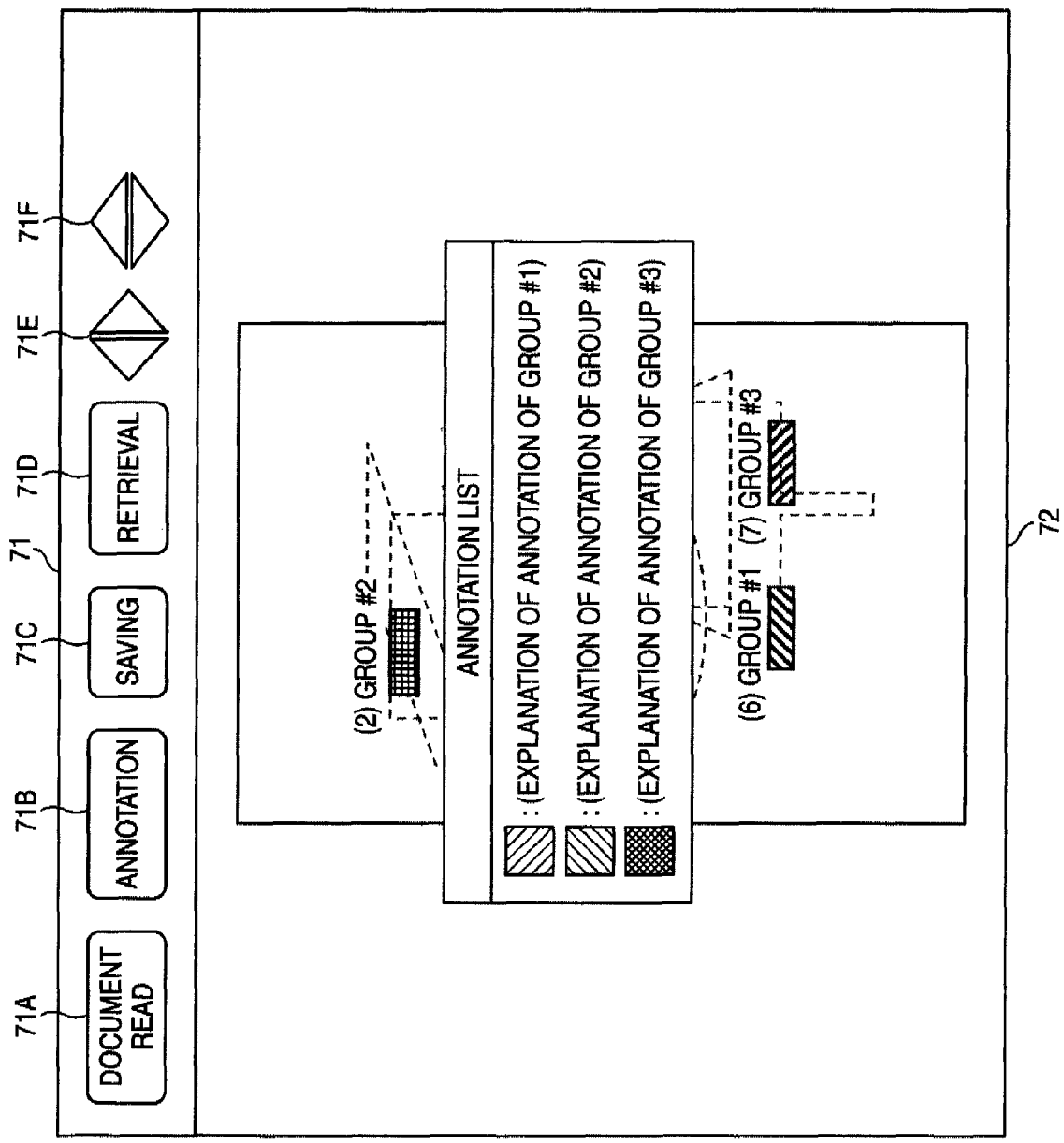
FIG. 14 is a view showing a typical screen configuration where annotation objects are list-displayed.

Further, through the operation of designating the retrieval button 71D within the button displaying area 71 on the viewer screen of the electronic document, the user can retrieve the annotation data contained in the electronic document so that they can be list-displayed within the document display area 72 as shown in FIG. 14. Using such list-display as an index list, any annotation object can be selected. Certainly, using the mouse 109 on the displayed image of the page displayed within the document displaying area 72, the user can directly select a desired annotation object. When a certain annotation object is selected by any user operating method, within the document displaying area 72, its display is jumped to the place (noted spot) where the corresponding annotation object is pasted.

Figure 15:
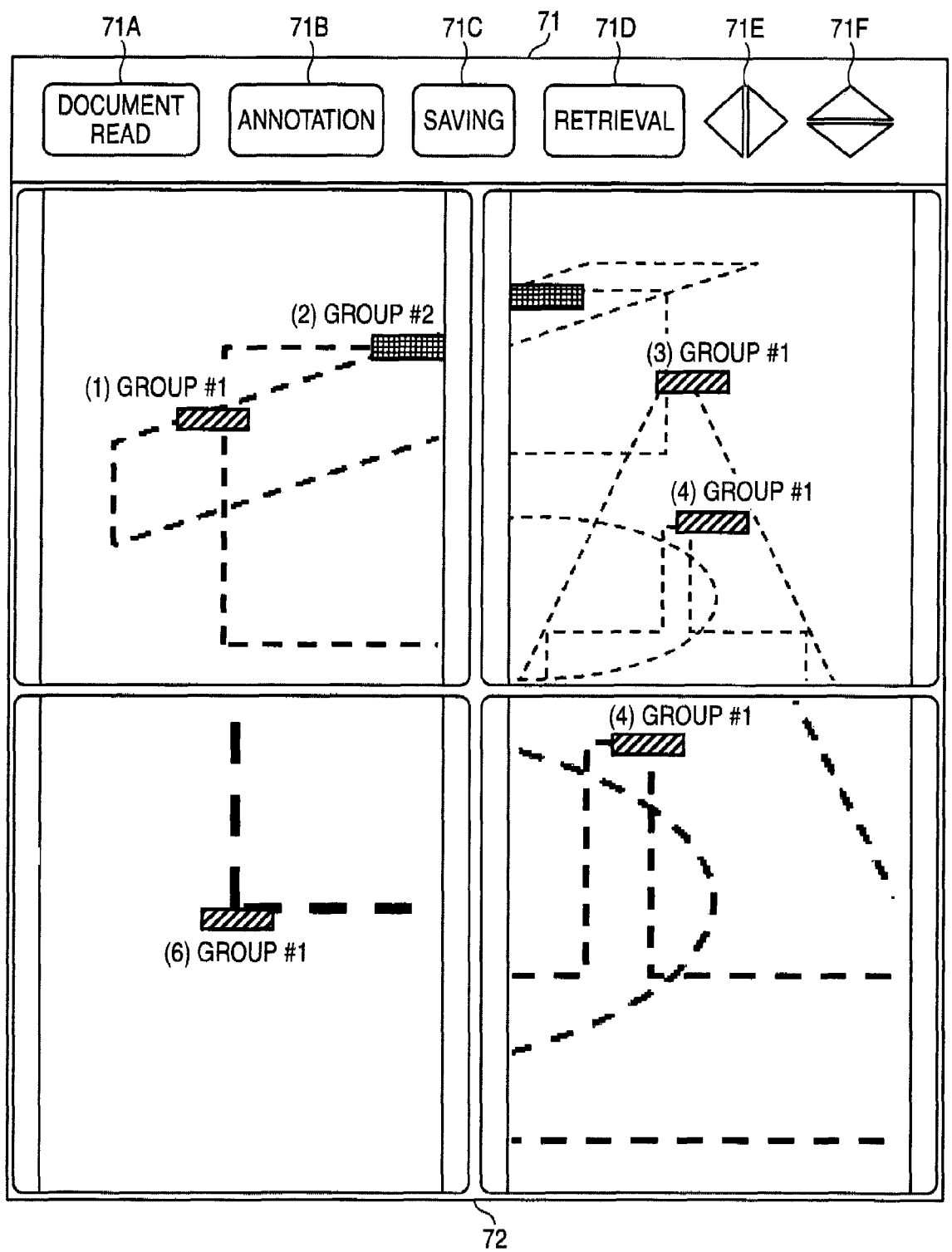
FIG. 15 is a view showing the situation where plural noted spots indicated by the annotation objects having the same group ID are simultaneously displayed on divided screens.

Now, if the group ID is valid, in response to the fact that any one annotation object in the list-display or one annotation object from on the page displayed within the document display area 72 has been selected, plural annotation objects having the same group ID will be selected. For example, if any one of the annotation objects belonging to the group #1 is selected on the large-format page where the annotation objects are pasted at the plural noted spots as shown in FIG. 11, as shown in FIG. 15, the document display area 72 is divided into four screens corresponding to the number of the annotation objects within the same group and the noted spots pasted with the annotation objects having the same group #1 are displayed, respectively (in the same page displaying state when the annotation objects have been pasted). Thus, the user can simultaneously display the plural noted spots to be edited so that they can be compared with one another.

Figure 16:
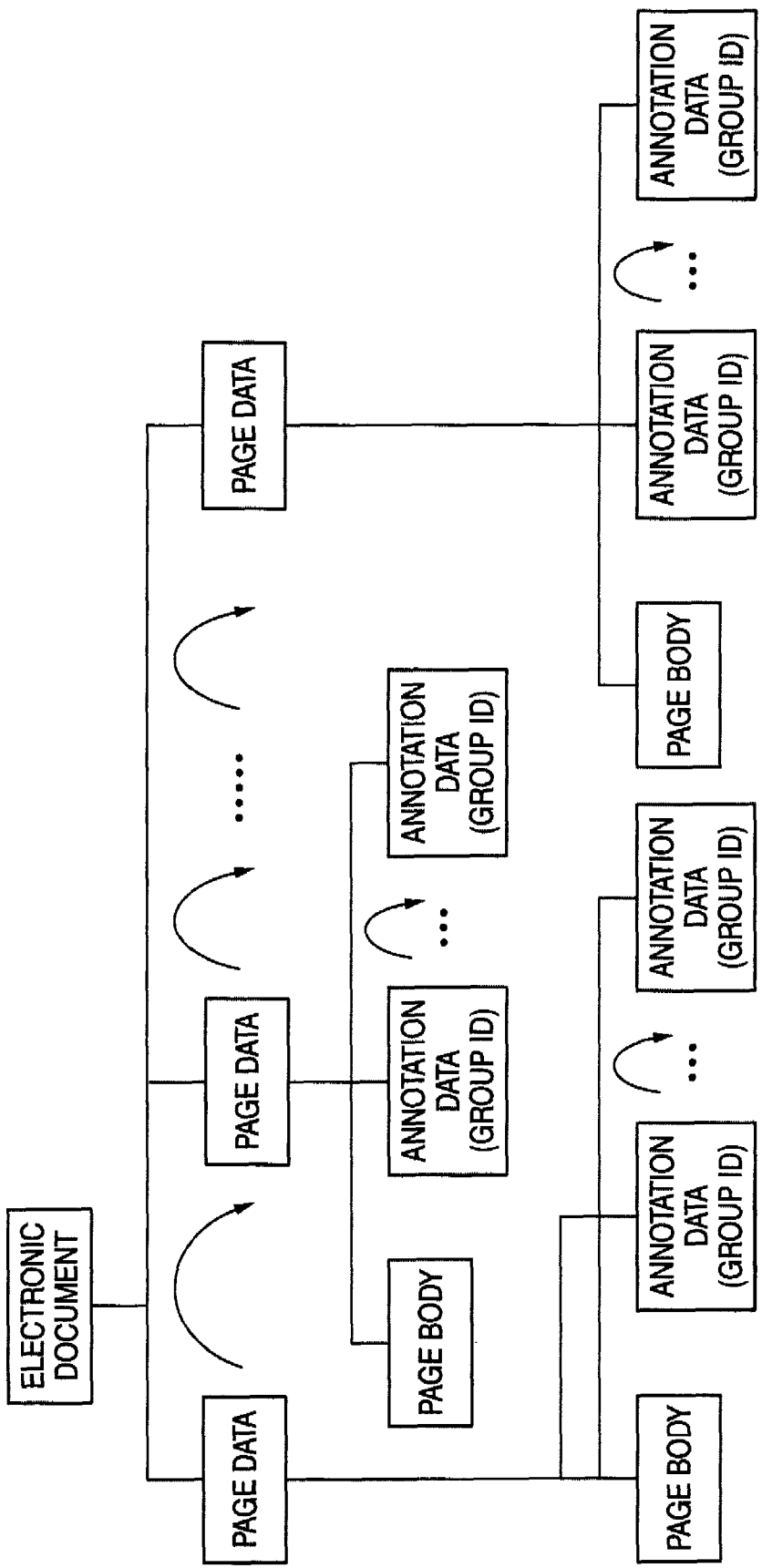
FIG. 16 is a view showing the manner of searching the annotation data having the same group ID from the electronic document data stored in the storage unit 10.

As shown in FIG. 2, the data of a single electronic document are constructed of the page data for the respective pages connected in a chain shape; each page data contain the body data such as the text data and the annotation data of all the annotation objects contained in the page. Therefore, as indicated in allows in FIG. 16, by searching the annotation data in each page data of the data of the electronic document, all the annotation objects having the same group ID can be extracted.

Figure 17:
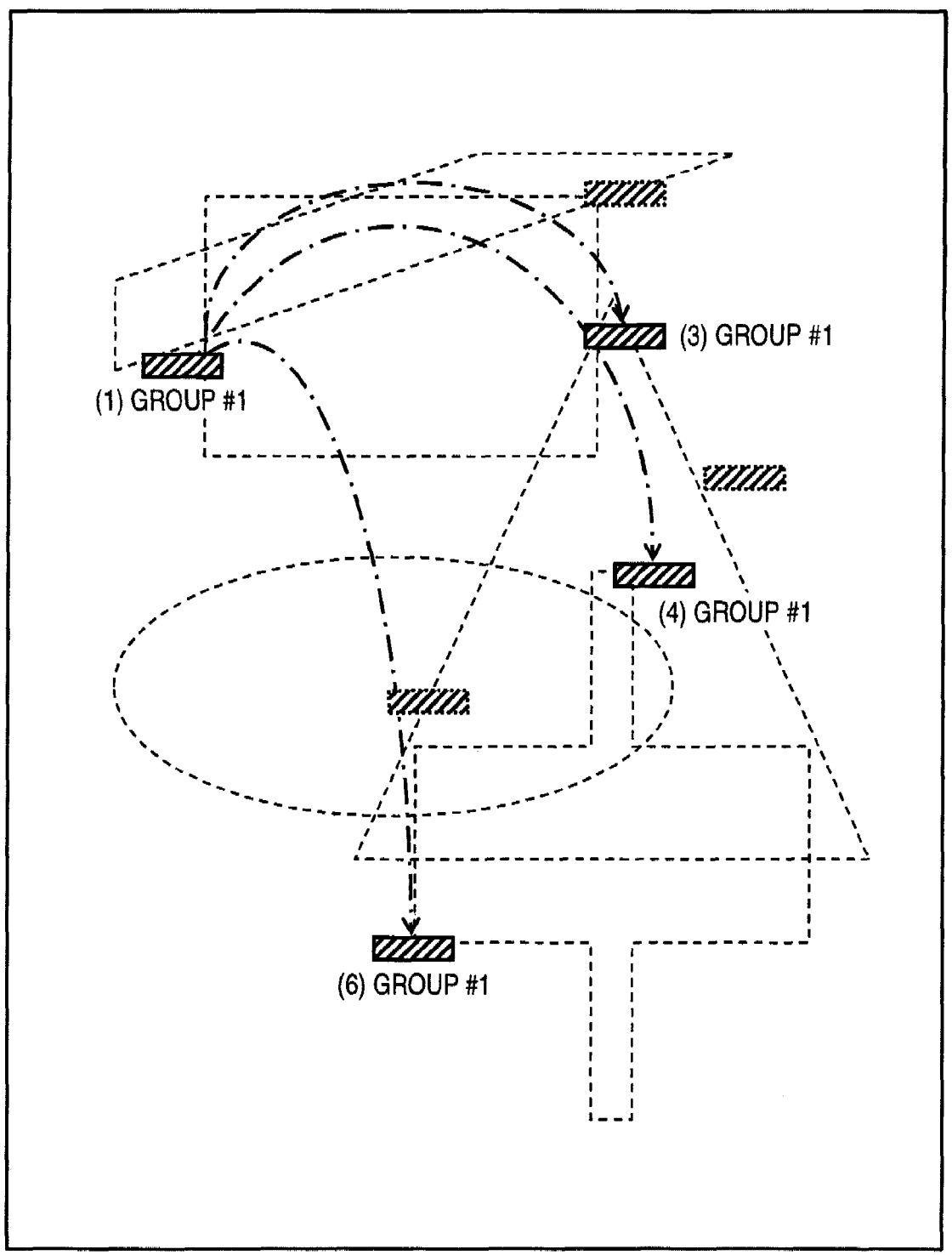
FIG. 17 is a view illustrating the operation of successively copying an annotation object assigned with a group ID onto other correlated noted spots.

Further, where the electronic document handled by the document management software consists of a large-format drawing and plural pages, as the case may, it is desired that the plural spots within the pertinent electronic document are simultaneously compared. In accordance with the document processing device according to this embodiment, if the annotation object is subjected to the copying operation, the displaying magnification and group ID of the annotation object at the copying source are copied as they are. Thus, if the editing operation of assigning the same group ID to the plural noted spots is once done, since the plural noted spots as desired to recognize simultaneously are efficiently correlated with one another, the user can refer to them over and over again. FIG. 17 illustrates the operation of successively copying the annotation object assigned with the group ID onto other correlated noted spots (the one-dot chain line in the figure means a general object copying operation on the computer).

Figure 18:
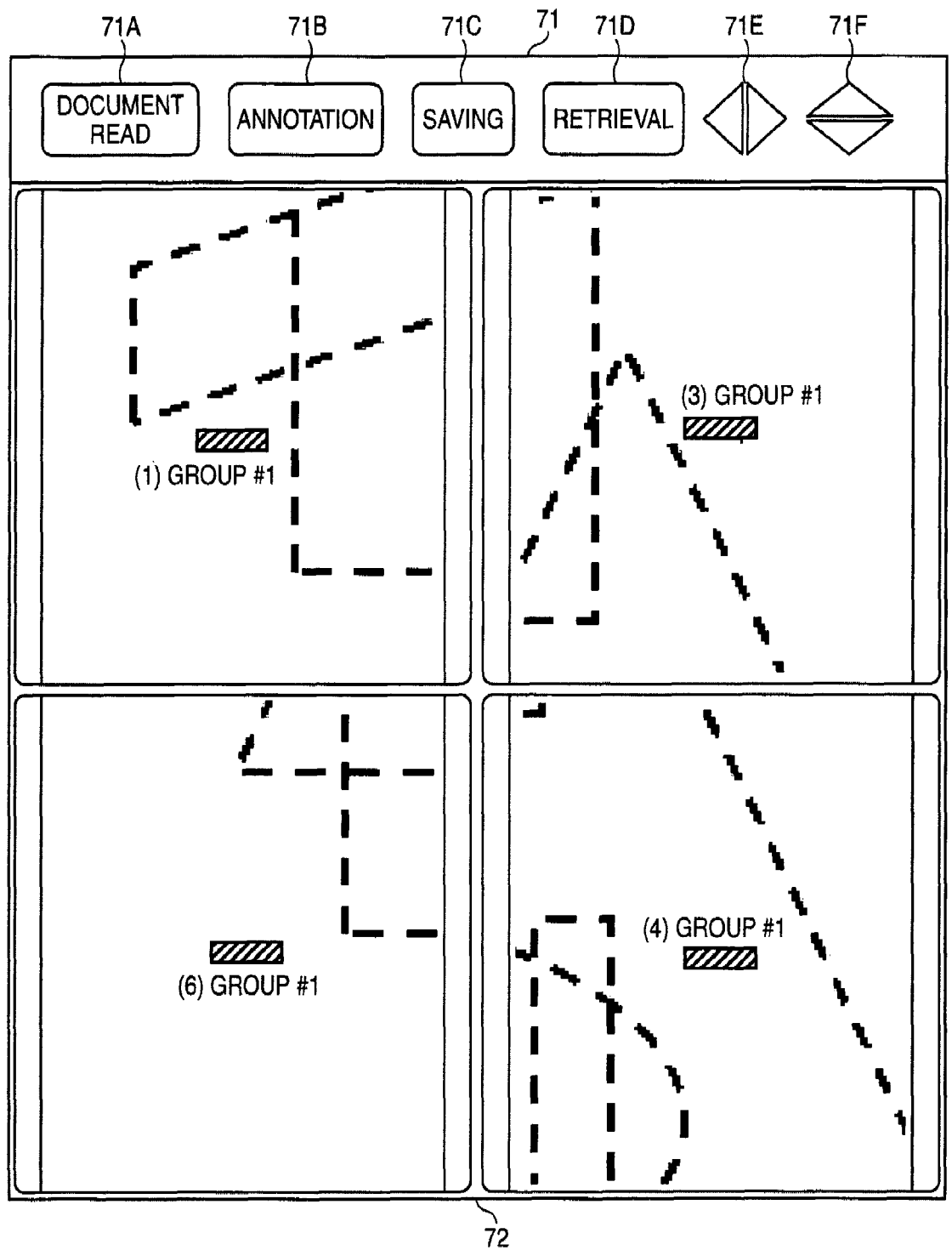
FIG. 18 illustrates the situation where the respective displaying positions assigned with the same displaying magnification and group ID as the annotation object at a copying source by a copying operation are displayed with the same magnification on plural screens.

In the subsequent editing operation of the electronic document, by only doing the operation of selecting the annotation at any one of the noted spots having the same group ID, the document display area is divided into plural screens; on each screen, the noted spots pasted with the annotations are simultaneously displayed. FIG. 18 illustrates the manner in which the respective displaying positions assigned with the same displaying magnification and group ID as the annotation object at the copying source by the copying operation are displayed with the same magnification on plural screens.

The annotation adopted in this embodiment is referred to as an "extensive annotation" in order to distinguish it from annotation usually adopted. As described above, the extensive annotation contains, in the annotation data, the information on the displaying position and displaying magnification when pasted and the group ID as an option. The electronic document containing the annotation data has the data structure as shown in FIG. 5, but its basis data structure remains unchanged. So, like the usual annotation, the annotation object can be optionally added or cancelled for the electronic document.

The annotation editing function from the viewer is such as already explained with reference to FIG. 5 and others. Where any position within a certain page and any page are displayed with any displaying magnification, like pasting of the usual annotation, the extensive annotation is pasted at any position within the displaying range. The annotation operation control unit 60, in an added data region of the pasted extensive annotation object, records the data such as the coordinates and size for displaying the annotation object of itself like the usual annotation as the data and also records the central coordinates and displaying magnification within the displaying range of the page being displayed at present, and adds them in the page data of the electronic document as the annotation data (see FIG. 2). Further, the annotation operation control unit 60 issues a unique ID to be registered as the group ID.

Where the extensive annotation is copied and pasted in a different displaying state, the annotation operation control unit 60 holds the displaying magnification and group ID from the copying source and updates the displaying information of the annotation object (the same data as the usual annotation) and central coordinates of the screen by the present state.

Next, an explanation will be given of the function of referring to the annotation from the viewer. In the list-display of the annotation objects (see FIG. 6), the extensive annotation is handled like the usual annotation so that it is list-displayed simultaneously with the usual annotation. In response to the fact that the extensive annotation has been selected by the user, the display is jumped to the page where the annotation object is pasted (or place where the annotation object is pasted). In this case, referring to the displaying magnification and displaying position recorded in the annotation data of the pertinent annotation object, the page displayed image creating unit 42 changes the displaying magnification of the displayed image of the page into that referred to and aligns the center of the displaying range of the page with the displaying position referred to. Thus, the displaying state when the annotation object has been pasted can be reproduced to display the page.

Further, unlike the usual annotation, plural extensive annotations can be simultaneously selected from the list. When an instruction of display is issued in this state, the page displayed image creating unit 42, using the technique such as screen division or simultaneous (superposed) display of plural windows, causes all the extensive annotation objects selected to be simultaneously displayed. As the similar function, where a single extensive annotation is selected to execute the group simultaneous display, the page displayed image creating unit 42 causes all the extensive annotations having the same group ID to be simultaneously displayed (see FIG. 18).

Figure 19:
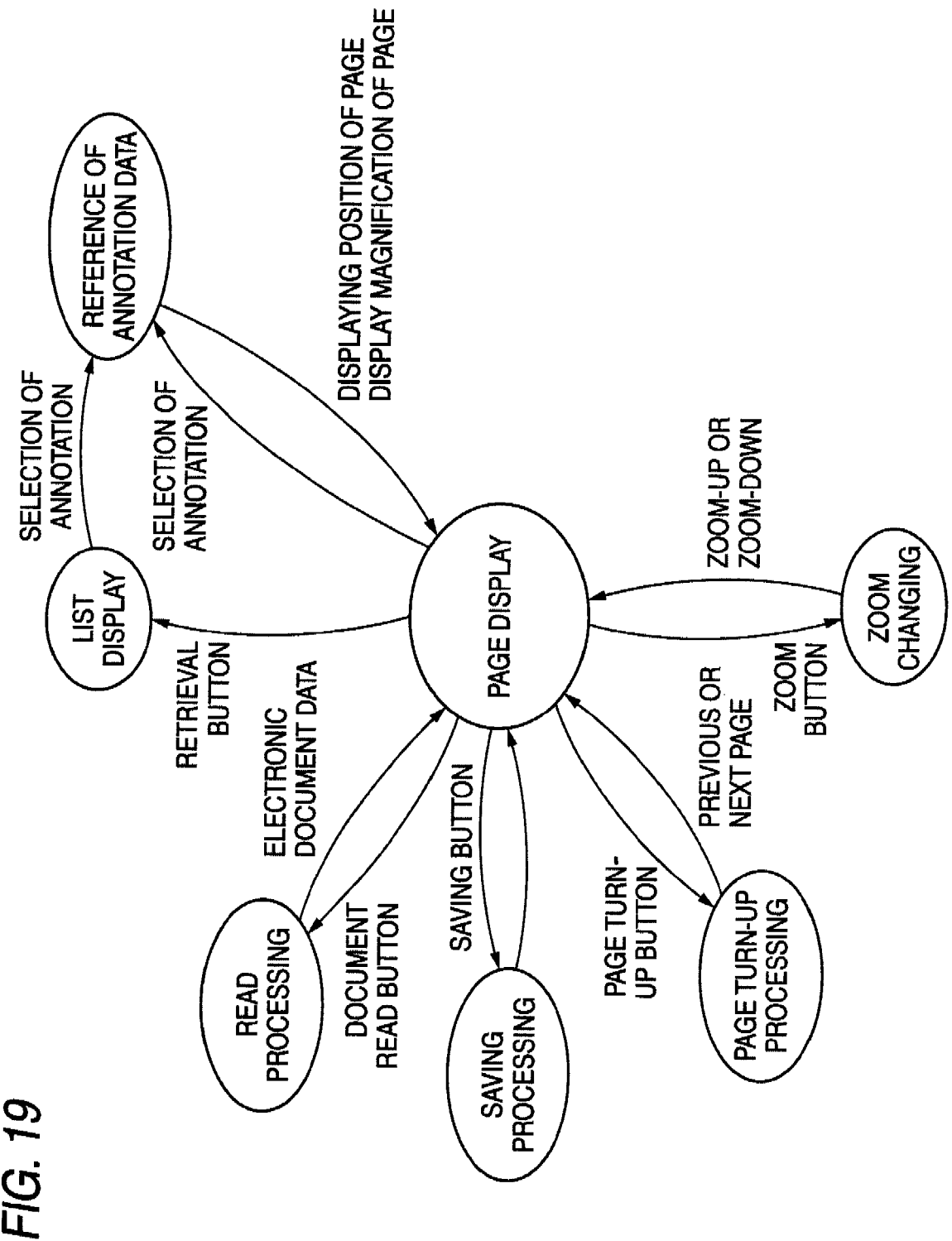
FIG. 19 is a status transition view when the annotation is referred to from a viewer.

FIG. 19 shows a status transition view when the annotation is referred to from the viewer.

As described previously, the viewer consists of the button displaying area 71 where the plural buttons are arranged and the document displaying area 72 where the page(s) of the document is displayed as an image.

When the user designates the document reading button 71A through operating the mouse 109, a desired electronic document is taken out from the storage unit 10. The page displayed image creating unit 42 displays, in the document displaying area 72, the first page of the electronic document at a default displaying position and displaying magnification.

On the page displayed in the document displaying area 72, the page edition of the electronic document and pasting of the annotation object onto the page, its canceling and changes in the setting contents using the annotation editing function are done.

Further, when the user designates the saving button 71C through operating the mouse 109, the processing of saving the electronic document displayed in the document displaying area 72 into the storage unit 10 is executed. As described in FIG. 2, the electronic document is a data file containing the page data of each page. The page data of each page consists of the text data corresponding to the page body (or image data of a photograph or drawing) and the annotation data of each annotation object pasted on the displayed image of the pertinent page. The contents of the annotation data changed using the annotation editing function are also saved.

Further, when the user designates the previous page feeding button or subsequent page feeding button of the page movement button 71E through operating the mouse 109, the display in the document displaying area 72 is changed into that of the previous page or subsequent page. In this case, the page is displayed at the default displaying position and displaying magnification.

Further, when the user designates the zoom button 71F through operating the mouse 109, in the document displaying area 72, the displaying magnification of the page being displayed at present is increased or decreased according to the quantity of operating the pertinent button. Further, the user drugs the page being displayed at present in the document displaying area 72 using the mouse 109 so that the displaying position of the page being displayed (displaying range of the page or page coordinate position being its center) can be moved.

Further, when the user designates the retrieval button 71D through operating the mouse 109, the annotation data contained in the electronic document are retrieved so that they are list-displayed within the document displaying area 72 (see FIGS. 6 and 14). Using this list-display as an index list, the user can select any annotation object. Otherwise, without using the list-display, the user can directly select, using the mouse 109, a desired annotation object on the displayed image of the page being displayed in the document displaying area 72.

If a new annotation object is selected by any technique, the annotation data are referred to so that the displaying position and displaying magnification of the page are taken out. The page displayed image creating unit 42 changes the displaying magnification of the page displayed image into that taken out and also aligns the center of the page displaying range to the displaying position taken out. Thus, the displaying status when the annotation object has been pasted can be reproduced to display the page.

Using the list-display of annotation objects as shown in FIG. 6, the user can also select plural annotation objects. Otherwise, where the group ID is valid, if any one annotation object is selected, the plural annotation objects having the same group ID will be selected.

Where the plural annotation objects are selected in this way, the page displayed image creating unit 42 screen-divides the document displaying area 72 into the number of the annotation objects selected. From the annotation data corresponding to each annotation object selected, the page coordinates and displaying magnification are taken out so that within each screen after divided, the displayed image of the noted spot pasted with the annotation object is reproduced on the basis of the page coordinates and displaying magnification taken out.

Figure 20:
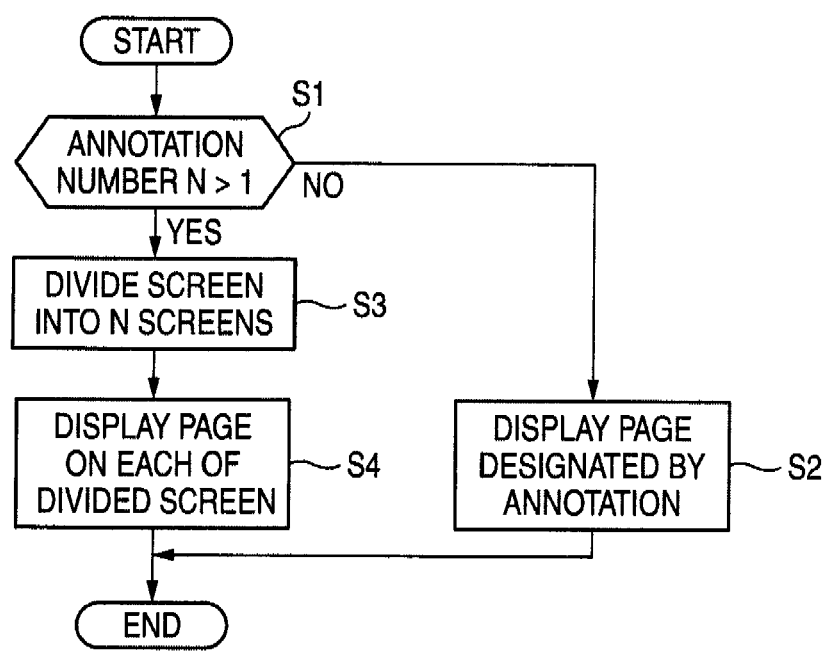
FIG. 20 is a flowchart showing the processing procedure of displaying the page in response to the fact that the annotation object has been selected.

FIG. 20 shows, in a flowchart format, the processing procedure of displaying the page in response to the fact that the annotation object has been selected.

First, checked is whether or not the number N of the annotation objects selected exceeds 1 (step S1).

If the user selects plural annotation objects through the list display of the annotation objects, the number of the annotation objects selected is identical to N. Further, if the group ID is valid, of the annotation data written in the electronic document, the number of the annotation objects having the same group ID as the annotation object selected by the user is equivalent to N.

If the number N of the annotation objects selected is 1 (No in step S1), referring to the displaying position and displaying magnification in the annotation data corresponding to the pertinent annotation object, the page displayed image creating unit 42 changes the displaying magnification of the page displayed image into that referred to and also aligns the center of the page displaying range to the displaying position referred to. Thus, the displaying status when the annotation object has been pasted can be reproduced to display the page (step S2).

On the other hand, if the number of the annotation objects selected is 2 or more (Yes in step S1), the page displayed image creating unit 42 divides the document displaying area 72 into N screens (step S3). From the annotation data corresponding to each annotation object selected, the page coordinates and displaying magnification are taken out so that within each of N screens divided, the displayed image of the noted spot pasted with the annotation object is reproduced on the basis of the page position and displaying magnification indicated in the corresponding annotation data (step S4).

Referring to the specific embodiment, the detailed explanation has been hitherto given on this invention. However, it is apparent that any modification or substitution can be made by those skilled in the art without departing from the sprit of this invention.

Where the electronic document dealt with by the document management software consists of a large-format drawing and plural pages, as the case may, it is desired that the plural spots within the pertinent electronic document are simultaneously compared. In accordance with the document processing device according to this embodiment, by once doing the editing operation of pasting the annotation objects at the respective noted spots of the electronic document and assigning the same group ID to their annotation data, or copying and pasting the annotation data assigned with the group ID at the respective noted spots, the user can refer to predetermined spots over and over again. In the subsequent editing operation of the electronic document, by only doing the operation of selecting the annotation at any one of the noted spots, or selecting a specific group ID from the list of the annotations, the document display area is divided into plural screens; on each screen, the noted spots (or pages) pasted with the annotations having the same group ID are simultaneously displayed.

Further, the noted spot displayed in response to the fact that the annotation object has been selected is located at the coordinates on the displayed image when the annotation object has been pasted. Therefore, the display will not be changed by re-pasting the annotation object. For example, even when the spot concealed by the annotation object is viewed, the annotation object can be light-heartedly moved on the page to display the concealed spot.

The document management software according to the present embodiment can be applied to an electronic map displaying system. For example, in case that one or more points on the map are recorded, each of the points can be referred at a displaying magnification that the user can easily view by recording until the displaying magnification.

Generally, in the electronic map displaying system, in referring to the map, by retrieving a destination in terms of a keyword or moving the map displayed, the map of the region corresponding to the destination which is a noted spot can be displayed. In this case, mostly, the displaying magnification of the map differs according to the purpose of referring to the destination. For example, where it is desired to know the course to the destination, the map is displayed with the displaying magnification permitting a peripheral region including the destination to be displayed; or where it is desired to know the detailed information such as an appearance view and an entrance of a building at the destination, the map is displayed with a larger displaying magnification permitting detailed display around the destination. In such a case, by pasting the annotation objects like this embodiment to the respective noted spots in the electronic map, the position coordinates on the map and displaying magnification may be correlatively stored in the respective annotation data. In such a configuration, if the map data are displayed with the annotation being designated, the display will be reproduced with the magnification stored around the noted spot stored. Further, by once doing the editing operation of pasting the annotation objects at plural noted spots and assigning the same group ID, or copying and pasting the annotation object assigned with the group ID at the respective noted spots, the user can refer to predetermined spots over and over again. Like the above referring/editing operation of the electronic document described above, by only doing the operation of selecting the annotation at any one of the noted spots, or selecting a specific group ID from the list of the annotations, the map displaying area is divided into plural screens; on each screen, the noted spots (or pages) pasted with the annotations having the same group ID may be simultaneously displayed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing apparatus comprising:
an operation input unit that receives an input of a user to control display of an electronic document;
an electronic document display control unit that displays a page of the electronic document on a screen;
an electronic document operation control unit that changes the display of the page between an expansion-display that displays expanded display of a portion of the page at a magnification and a reduction-display that displays glancing over the entire page;
an annotation operation control unit that adds at least one annotation object on the portion of the page when the page is displayed in the expansion-display; and
an electronic document data holding unit that holds page data of the page of the electronic document,
wherein the annotation operation control unit stores the magnification for the expansion-display that displays a part of the electronic document when the annotation data is added to the portion of the page, and
wherein the electronic document display control unit, in response to the operation input unit receiving an input of the user to select the at least one annotation object, changes the display on the screen from the reduction-display to the expansion-display having the magnification stored by the annotation operation control unit.

2. The information processing apparatus as claimed in claim 1, wherein the at least one annotation object comprises a plurality of annotation objects, and
wherein the electronic document display control unit, in response to the operation input unit receiving an input of the user to select the plurality of annotation objects, divides the screen into a plurality of screens on each of which the page of the electronic document is displayed based on the magnification and the portion of the page stored in the electronic document data holding unit corresponding to each of the plurality of annotation objects.

3. The information processing apparatus as claimed in claim 1, wherein the at least one annotation object comprises a plurality of annotation objects,
wherein each of the plurality of annotation objects added on the page through the annotation operation control unit is associated with group identifying information, and
wherein the electronic document data holding unit stores the group identifying information associated with each of the plurality of annotation objects in page data corresponding to the group identifying information.

4. The information processing apparatus as claimed in claim 3, wherein the electronic document display control unit, in response to the operation input unit receiving an input of the user to select the plurality of annotation objects, divides the screen into a plurality of screens on each of which the page of the electronic document is displayed based on the magnification and the portion of the page stored in the electronic document data holding unit corresponding to each of the plurality of annotation objects having the same group identifying information as the selected plurality of annotation objects.

5. The information processing apparatus as claimed in claim 3, wherein the annotation operation control unit, in response to the operation input receiving unit receiving an input of the user to copy to another portion of the page at least one of the plurality of annotation objects having the group identifying information at the portion of the page, associates the group identifying information and the magnification to the copied at least one of the plurality of annotation objects.

6. An information processing method comprising:
receiving an input of a user to control display of an electronic document; displaying a page of the electronic document on a screen;
changing the display of the page between an expansion-display that displays expanded display of a portion of the page at a magnification and a reduction-display that displays glancing over the entire page;
adding at least one annotation object on the portion of the page when the page is displayed in the expansion-display; and
storing page data of the page of the electronic document;
storing the magnification for the expansion-display that displays a part of the electronic document when the annotation data is added to the portion of the page; and
changing the display on the screen from the reduction-display to the expansion-display having the stored magnification, in response to receiving an input of the user to select the at least one annotation object.

7. A non-transitory computer readable medium storing a program causing a computer to execute a process for performing processing of electronic information, the process comprising:
receiving an input of a user to control display of an electronic document;
displaying a page of the electronic document on a screen;
changing the display of the page between an expansion-display that displays expanded display of a portion of the page at a magnification and a reduction-display that displays glancing over the entire page;
adding at least one annotation object on the portion of the page when the page is displayed in the expansion-display; and
storing page data of the page of the electronic document;
storing the magnification for the expansion-display that displays a part of the electronic document when the annotation data is added to the portion of the page; and
changing the display on the screen from the reduction-display to the expansion-display having the stored magnification, in response to receiving an input of the user to select the at least one annotation object.

8. An information processing apparatus comprising:
a display that displays a page of an electronic document;
a memory that stores data of the page of the electronic document, an annotation added to a portion of the page of the electronic document that is displayed in an expansion-display that displays an expanded display of the portion of the page at a magnification, and annotation data that indicates at least one of the portion of the page displayed on the display and the magnification of the portion of the page displayed on the display;
an input unit that receives a first user input to at least one of add the annotation to the portion of the page of the electronic document displayed in the expansion-display and change at least one of the portion of the page in the expansion-display and the magnification of the portion of the page in the expansion-display, and a second user input to select the annotation; and
a processor that stores the at least one of the portion of the page in the expansion-display and the magnification of the portion of the page in the expansion-display in the memory as the annotation data, in response to the input unit receiving the first user input, controls the display to display the portion of the page at the magnification based on the annotation data stored in the memory, in response to the input unit receiving the second user input, and controls the display to change between the expansion-display and a reduction-display that displays the entire page.

* * * * *